(12) United States Patent
Biagi et al.

(10) Patent No.: US 7,090,641 B2
(45) Date of Patent: Aug. 15, 2006

(54) ULTRASOUND IMAGE FOCUSING METHOD AND RELATIVE ULTRASOUND SYSTEM

(75) Inventors: Elena Biagi, Florence (IT); Leonardo Masotti, Florence (IT); Marco Scabia, Florence (IT); Iacopo Rossi, Grosseto (IT); Nicola Dreoni, Florence (IT)

(73) Assignees: Actis Active Sensors S.r.l., (IT); Esaqte S.p.A., (IT)

( * ) Notice: Subject to any disclaimer, the term of this patent is extended or adjusted under 35 U.S.C. 154(b) by 185 days.

(21) Appl. No.: 10/718,333

(22) Filed: Nov. 20, 2003

(65) Prior Publication Data
US 2004/0143187 A1    Jul. 22, 2004

(30) Foreign Application Priority Data
Nov. 22, 2002    (IT) ............................ FI2002A0228

(51) Int. Cl.
*A61B 8/00* (2006.01)
(52) U.S. Cl. ..................................... 600/443
(58) Field of Classification Search ................ 600/437, 600/442, 443, 447; 73/1.82, 602; 367/46, 367/119
See application file for complete search history.

(56) References Cited

U.S. PATENT DOCUMENTS 5,793,703 A * 8/1998 Shippey ...................... 367/88
5,935,068 A * 8/1999 Zhu et al. .................... 600/443
6,608,585 B1 * 8/2003 Benitz ....................... 342/25 R
6,704,438 B1 * 3/2004 Alexandru .................. 382/128

\* cited by examiner

Primary Examiner—Francis J. Jaworski
(74) Attorney, Agent, or Firm—McGlew & Tuttle, PC

(57) ABSTRACT

The method comprises the phases of: sending a series of excitation ultrasonic signals to a volume being investigated, by means of an array of transducers aligned in a transverse direction (x), said ultrasonic signals propagating in depth in said volume according to a direction of propagation (y); acquiring, by means of said transducers, signals reflected from reflectors located in the volume being investigated; performing on said reflected signals a transform in the transverse direction from a spatial domain (x,y), defined by said transverse direction (x) and by said direction of propagation (y), to a first transformed domain; applying, in the transformed domain, a two-dimensional transformation, to straighten every curved image (Ip1, Ip2, Ip3) of a reflector in said volume being investigated and make it essentially orthogonal to the direction of propagation (y); compressing, in the transverse direction (x) each of the straightened curves (Im1, Im2, Im3) to concentrate said straightened image in a zone centered at the level of the position of said reflector along said transverse direction (x).

20 Claims, 24 Drawing Sheets

(a)　(b)　(c)

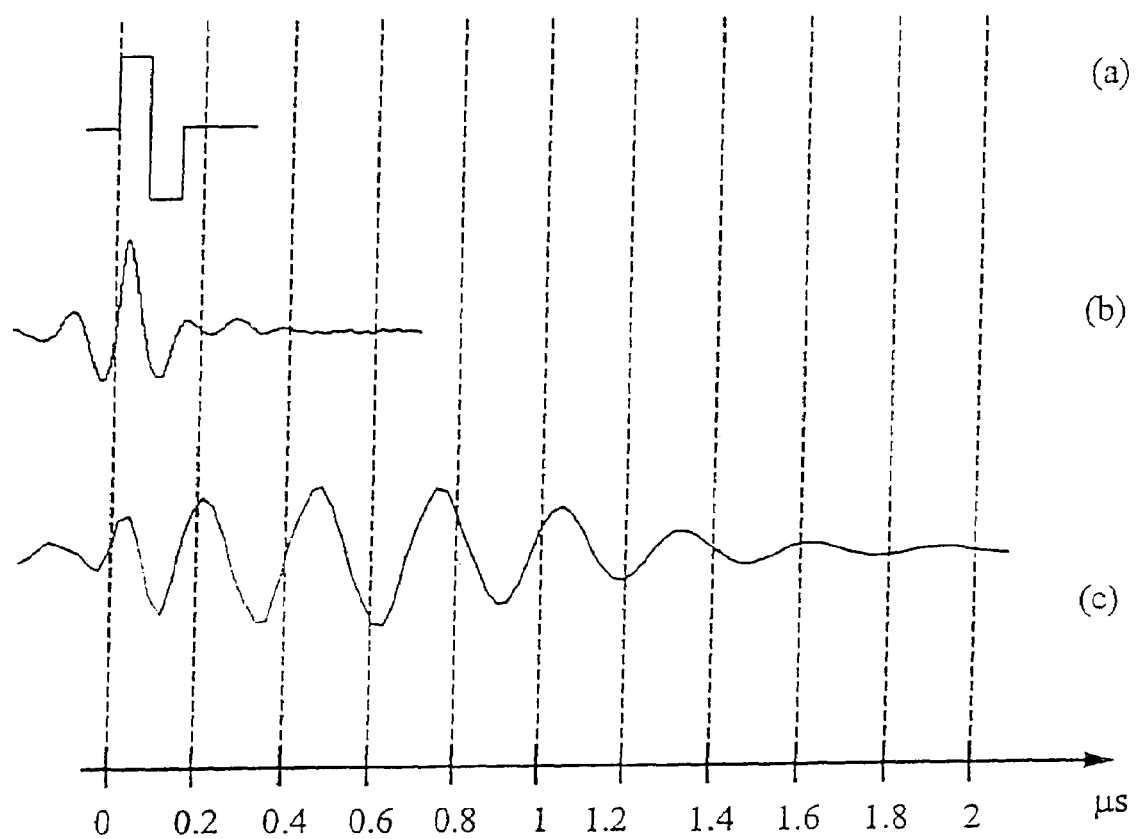

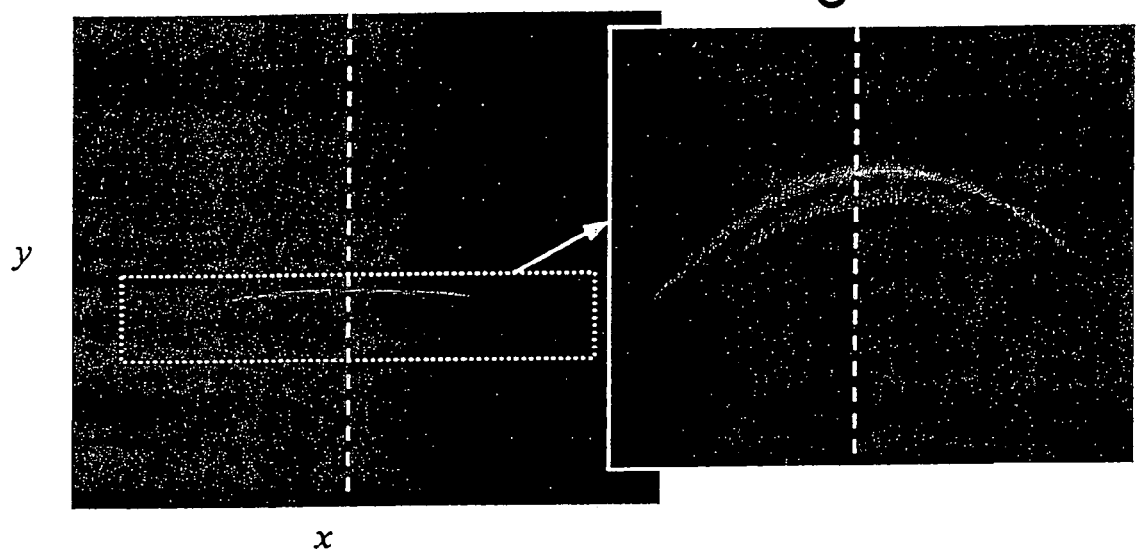

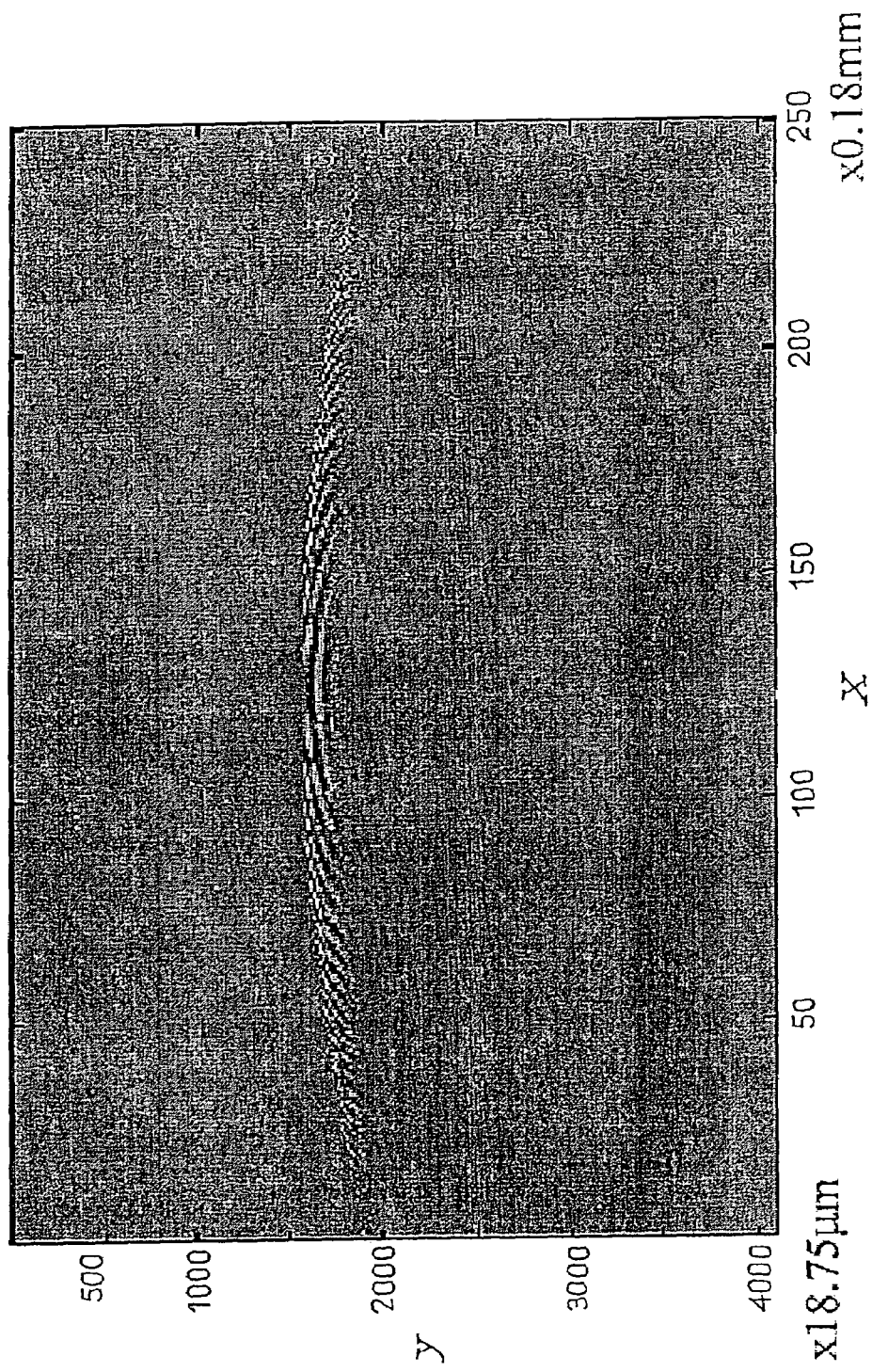

Fig. 30A
Fig. 30B
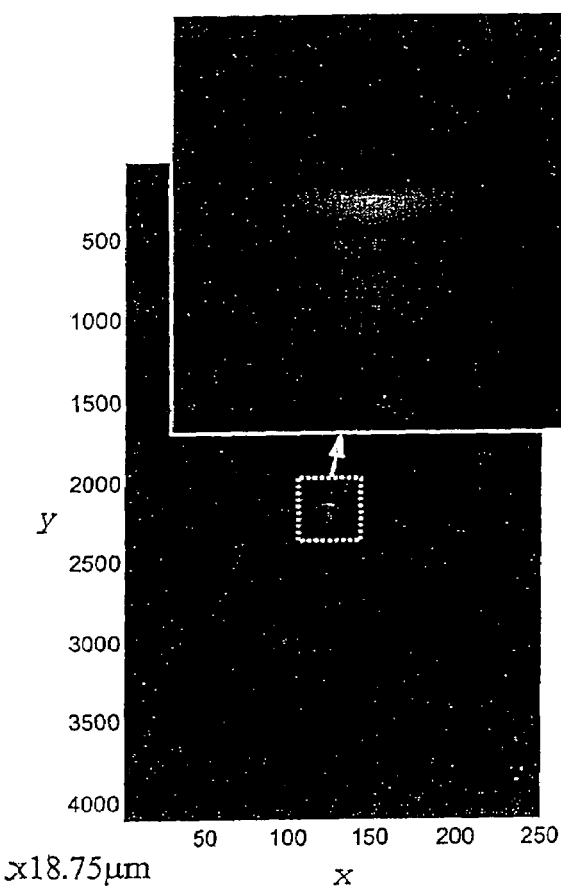
x18.75μm
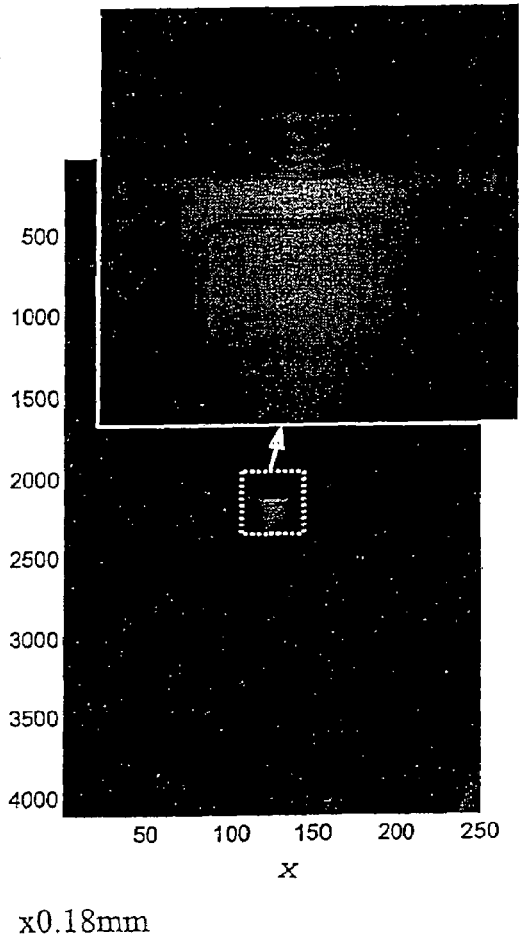
x0.18mm

ULTRASOUND IMAGE FOCUSING METHOD AND RELATIVE ULTRASOUND SYSTEM

TECHNICAL FIELD

The present invention relates to an ultrasound image focusing method, and in particular to perform focusing in a transverse direction, that is in the direction parallel to the extension of the array of transducers forming the ultrasound probe.

The invention also relates to an ultrasound system, i.e. an ultrasound instrument that implements said method.

PRIOR ART

Probes generally used In ultrasound investigations are composed of a series of transducers or piezoelectric elements disposed in a one-dimensional array, or of a single mechanical scanning transducer. Ultrasound scans are produced by placing side by side the traces obtained from different transducers, or from different positions of the single transducer in the case of a single element probe. The transducers generate ultrasonic signals that propagate in the body to be investigated and receive the ultrasonic signal reflected from the reflectors located in the body. The image of the inside of the body examined is reconstructed from the reflected or-back-propagated signal.

For perfect reconstruction of the section investigated in the ultrasound scan, the transducers should have an appreciable sensitivity only in an infinitesimal solid angle, in order to receive the ultrasounds coming from one direction only. In actual fact, a transducer presents a radiation diagram with a lobe with non-null dimensions around the main direction and possibly also from secondary lobes. FIG. 1 shows a radiation diagram of an ultrasonic transducer, with a main lobe and a series of secondary lobes, represented in the three-dimensional space x, y, z.

For this reason each transducer sends and receives ultrasounds not only in the main direction (the direction of the z axis in FIG. 1) but also laterally. In the investigation plane of the array, the ultrasounds back-propagated from a reflector located in the tissue being investigated are not only picked up by the nearest transducer (that is the one aligned on the z axis with the reflector) but also by, those around it, which increase in number in proportion to the size of the radiation lobe of the transducers. In the acquired signal the reflector therefore appears in many traces and with different delays, proportional to the distance between the reflector and the various transducers in the array. In these conditions, in the image constructed by the scanner the reflector does not appear as a point but as a curve.

This phenomenon is shown schematically in FIGS. 2 and 3. FIG. 2(a) shows how the ultrasounds emitted by a generic transducer Tr are propagated along different directions, while FIG. 2(b) shows how a generic transducer Tr receives the ultrasounds reflected from reflectors R1, R2 disposed in different positions. Finally, FIG. 2(c) shows how the echo signal produced by a single reflector is not only received by the transducer Tr nearest to it, but also by the adjacent transducers. When a transducer receives an echo signal from a reflector, this signal is seen as if it always came from a reflector disposed directly under the transducer, that is along the axis of propagation of the main lobe of the transducer, even when in actual fact it is a signal propagated by a reflector positioned laterally in respect of the transducer in question. Moreover, the transducer "sees" this reflector at a depth greater than the actual depth.

As the pattern of the distances of a single reflector in respect of the various transducers of the array is hyperbolic, the image of this reflector received by the array of transducers is a curve formed of a branch of hyperbola, as shown as an example in FIG. 3. Here S generically indicates the robe constituted by an array of transducers Tr aligned in the x direction, while y indicates the direction of propagation of the wave front. The reflector is located in the point with coordinates $x_0$, $y_0$, and is "seen" by the array of transducers as a branch of hyperbola C, with the vertex positioned at the level of the reflector.

It is evident that the images obtained in this manner are substantially distorted, cannot be used directly and must be processed. Ultrasound focusing consists exactly of this: restoring the images as closely as possible to those that would have been obtained from transducers with a radiation lobe of infinitesimal dimensions.

In the case of probes with a linear array, constituted by an array of transducers Tr disposed along a straight line, two types of focusing are required: transverse, that is in the direction (x) in which the array of transducers extends, and in the direction perpendicular to it and to the direction (y) of propagation of the ultrasounds, that is in the direction orthogonal to the plane in FIG. 3. The second type of focusing is obtained by inserting an acoustic lens in front of the array of transducers, focused at around half of the maximum depth at which the probe is expected to be used.

On the other hand, with regard to transverse focusing, scanners usually use both transmit focusing, as described hereunder, and also receive focusing, which is the true focusing of the image and which produces all traces of the focused image adding to it, after having delayed them appropriately, a certain number of traces received from adjacent elements of the array, as described later.

Transmit focusing is not image focusing, but rather a technique to concentrate the energy transmitted at a certain depth. An acoustic lens is not used although the effect is simulated electronically. Each ultrasonic pulse is sent almost simultaneously by a group of transducers adjacent to the central one. Each transducer in the group emits a pulse brought forward by a time defined by a theoretical hyperbolic law. However, in practice various scanners use a parabolic approximation.

In this way the pulses transmitted are in phase with one another at a certain distance from the probe; in this position if is said that transmission has been focused.

To concentrate the energy transmitted at various distances from the array, the operation described must be repeated varying the focus position each time. However, this procedure requires more than one pulse to obtain each single trace, and therefore drastically delays generation of the complete image. In fact, the same number of traces as the transmit foci used must be acquired to obtain an image. In instruments available on the market it is generally possible to position from a minimum of one focus during transmission to a maximum of a few foci, for the number of images per second presented to the user to remain acceptable.

Ultrasound image focusing is mainly, performed during reception of the ultrasounds. Acoustic lenses are not used in this phase either, but electronic arrangements that simulate the effect. After transmission of a pulse, the ultrasounds propagate in the material being examined, are reflected and return towards the probe. Those coming from a reflector positioned at a certain depth reach the transducers of the array with times that follow a hyperbolic pattern. The electric pulses generated by these transducers are also delayed with the same pattern. Receive focusing consists in adding the electric signals produced by a group of adjacent transducers to the signal of a transducer of the array, after having compensated the delays to which they are subjected. This procedure is repeated for each trace, moving the group of transducers used by one transducer.

As the law regulating the delays with which the ultrasounds reach the array varies according to depth, the one used to compensate these delays must also vary according to the depth to be focused. However, this means that the curve of the delays used in receive focusing varies through time, as with the passing of time ultrasounds coming from increasingly large depths reach the array in the reception phase. This is called dynamic receive focusing. This functions as if there were a lens with variable focus length in front of each transducer during the reception time.

Correct implementation of dynamic receive focusing poses a few practical problems. It is not easy to continuously modify the curve of delays used to combine the traces, discretization of the variations, division of the examined depth into intervals and use of a single curve in each interval may be taken into consideration. The fewer the number of different curves used the worse the results obtained will be. Moreover, in some instruments the curve of delays is not an arc of hyperbola but a branch of parabola that approximates the exact curve: this is further approximation of the ideal case that worsens the results.

Assuming that it were possible to perform it correctly, if receive focusing was the only focusing used, the ultrasound images could be processed to obtain good results. However, scanners generally also use transmit focusing, to combat attenuation to which acoustic waves propagating in the organic tissues are subjected. In these conditions, the ultrasounds reach the transducers with the morphology expected from receive focusing only if they come from the depths corresponding to the transmit foci. The ultrasounds coming from other depths are distorted by transmit focusing and cannot be correctly processed. In this way a resolution is obtained that is not uniform with the depth, only good at the level of the foci used in transmission.

As well as limited resolution, inaccurate ultrasound focusing can produce artifacts in the images, i.e. details that in actual fact are not found in the investigated section.

The most visible effect is in any case extension of each point of the image into a figure whose form and dimensions depend on the depth.

OBJECTS AND SUMMARY OF THE INVENTION

The object of the present invention is to produce a method for transverse focusing, that is parallel to the alignment along which the transducers forming the array of transducers of the probe are disposed, of an ultrasound image that does not have the drawbacks of prior art.

More specifically, the object of the present invention is to produce a focusing method and an ultrasound system that uses said method, which obtains higher quality results in respect of prior art methods.

Essentially, the method according to the invention consists of the following phases:

sending to a volume being investigated a series of ultrasonic signals, through an array of transducers aligned in a transverse direction, said ultrasonic signals propagating in depth in the volume according to a direction of propagation;

acquiring, through said transducers, the signals reflected from reflectors located in the volume being investigated;

following coherent demodulation of the signal to return it to a base band, or to translate the spectrum straddling the zero point frequency, performing on the reflected signals a transform in the transverse direction from a spatial domain, defined by the transverse direction and by the direction of propagation, to a first transformed domain;

applying, in the transformed domain, a two-dimensional transformation, to straighten a curved image of a reflector and make it essentially-orthogonal to the direction of propagation;

compressing each straightened curve in the transverse direction to concentrate the straightened image in a zone centered at the level of the position of said reflector along the transverse direction.

The last phase also comprises, in practice, an inverse Fourier transform that returns the image to the spatial domain.

In practice, the method according to the invention is based on pulse compression in a lateral direction of the signal acquired with a probe that does not utilize electronic focusing, this operation being preceded by coherent demodulation of the signals acquired.

In order to perform pulse compression in a lateral direction, as the ultrasound images are affected by substantial curvature as discussed hereinbefore, the image was taken to the frequency domain through a transform in the direction orthogonal to the direction of propagation of the pulse. Remapping is performed in the transformed domain to "straighten" the image by moving its points in the direction parallel to the direction of propagation of the pulse in the volume being investigated. Through remapping the curvature of the image is completely eliminated and it is therefore possible to compress the pulse in a lateral direction, thus obtaining a focused image.

In a practical embodiment, the transform in the transverse direction can be a Fourier transform. In view of the complexity of the function that expresses the image signal, this transform may in actual fact be approximated with the principle of the stationary phases. Compression of the signal in the transverse direction consists of three steps: transform, phase and gain compensation, inverse transform. Remapping allows this pulse compression to be implemented through processing performed on lines orthogonal to the direction of propagation of the ultrasounds.

The ultrasonic signal sent in sequence by the transducers to the volume being investigated can be a traditional ultrasound signal. Alternatively, and preferably, though, chirp signals, or frequency modulated signals in general, are used. This makes it possible to obtain deeper penetration thanks to increased signal energy and improved image definition.

When a frequency modulated signal is used, for example with a linear modulation, the signal must be compressed in the direction of propagation, as well as in the transverse direction. This compression is advantageously, although not obligatorily, performed with a time-frequency transform. Also in this case a Fourier transform may be used. Preliminarily, though, the signals reflected from the reflectors and picked up by the transducers of the probe are returned to the base band through coherent demodulation.

Moreover, compression of the signal in the direction of propagation, comprises a phase and gain compensation operation of the signal.

As will be apparent from the analytic explanation of the method of the present invention, the image of the volume being investigated is constructed by sending the ultrasonic signal from the various transducers that are excited in sequence. In practice, therefore, the various transducers of the: array forming the probe are excited one after another, and this occurs analogously in reception. A transducer is excited, transmits an ultrasonic signal and places itself in the condition to receive the ultrasound signal. After an established time, the adjacent transducer in the array is excited, and so on. This differentiates the method described in respect of receive focusing of traditional scanners, which uses a large number of transducers to receive the reflected signal and adds the electric signals obtained to construct a trace of the image.

Focusing operations are performed on all the signals thus acquired, which represent the initial image.

The invention also relates to an ultrasound system comprising at least a probe with an array of transducers aligned according to a transverse direction of alignment, means to excite said transducers in sequence, processing means to receive and process signals reflected from reflectors contained in a volume being investigated in which ultrasonic signals generated by said transducers are propagated, said processing means performing transverse focusing of the ultrasound signal received from said transducers with a method according to one or more of the previous claims.

BRIEF DESCRIPTION OF THE DRAWINGS

The invention shall now be better understood by following the description and accompanying drawing, which shows a non-limiting practical embodiment of the invention. More specifically, in the drawing:

FIG. 15 shows the non-modulated signals used for experimental tests;

FIG. 16($b$) shows the central trace of the image in FIG. 16($a$);

FIG. 17($b$) shows the enlargement of the central trace of the image in FIG. 17($a$);

FIG. 18($a$) shows the module of the image in FIG. 17($a$) focused in depth;

FIG. 18($b$) shows an enlargement of the central zone of the image in FIG. 18($a$);

FIG. 19($b$) shows the same trace as FIG. 19($a$) represented in logarithmic scale;

FIG. 20($b$) is an enlargement of a portion of FIG. 20($a$);

FIG. 21($b$) shows an enlargement of a central detail of FIG. 21($a$);

FIG. 22($b$) shows the same image as FIG. 22($a$) represented with a logarithmic grey scale;

FIG. 23($b$) shows the same module as FIG. 23($a$) in logarithmic scale;

FIG. 26 shows the real signal acquired by the scanner generated by a taut thread in water, obtained with a non-frequency modulated signal.

FIG. 27($b$) shows the same module of the image in FIG. 26 after focusing, in logarithmic grey scale;

FIG. 28($b$) shows the same module as FIG. 28($a$) in logarithmic scale;

FIG. 29($b$) shows the same module as FIG. 29($a$) in logarithmic scale;

FIGS. 30($a$) and ($b$) show a traditionally focused image of a taut thread in water, respectively in linear grey scale and in logarithmic scale;

DETAILED DESCRIPTION OF THE PREFERRED EMBODIMENTS OF THE INVENTION

1. Description of the Processing Method

Figure 1:
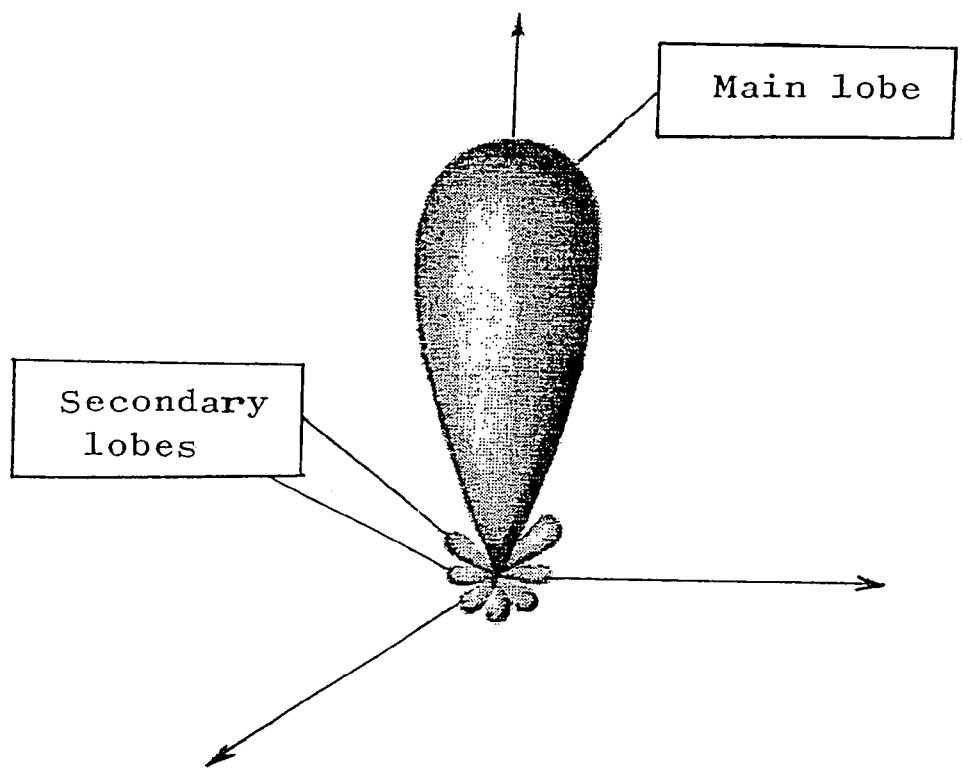
FIG. 1 is a radiation diagram of an ultrasonic transducer.
Figure 2:
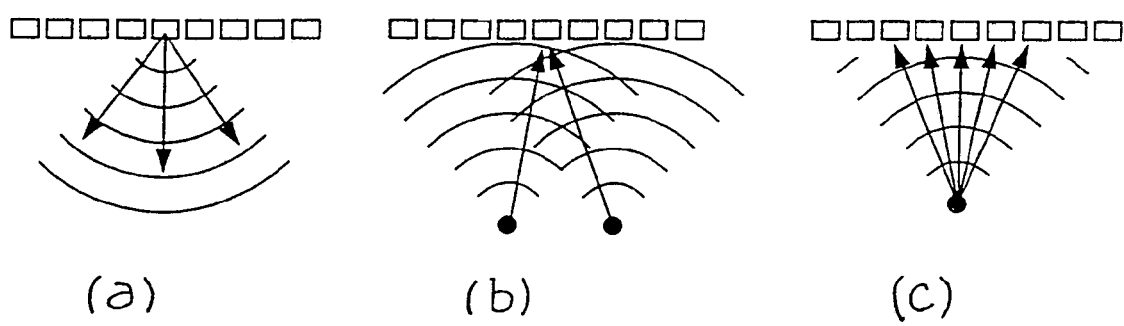
FIG. 2 is a schematic representation of the effect of the lateral sensitivity of a transducer of a linear array of transducers of an ultrasonic probe.
Figure 3:
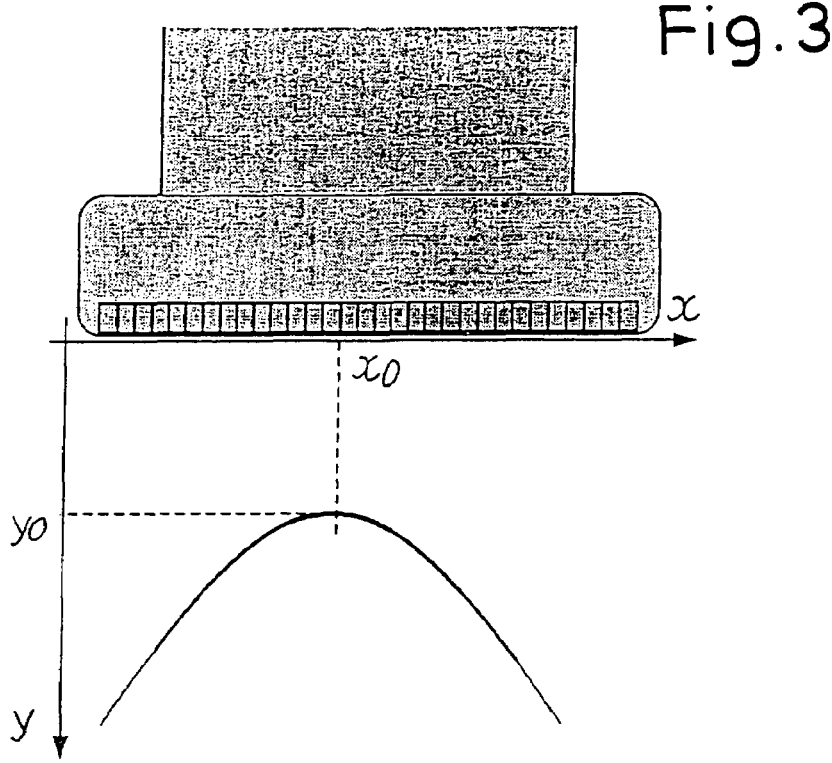
FIG. 3 is a diagram showing an ultrasonic probe and the image of a point reflector detected by it, in the absence of focusing.

FIG. 3 schematically shows an ultrasound probe S with an array of transducers Tr aligned in the x direction, hereinafter also called main direction of the array of transducers. In the method of the present invention the transducers Tr are excited in sequence to emit an ultrasound signal. In the example illustrated here, the signal emitted is frequency modulated, meaning that it is a "chirp" signal. The signal reflected from the reflectors contained in the tissue—or in the body being investigated—for each ultrasonic signal emitted by a single transducer influences a large number of transducers in the array, which perceive it with different amplitudes according to the angle of incidence, although only the electric signal produced by the transducer that transmitted the impulse is used to generate the image.

Figure 4:
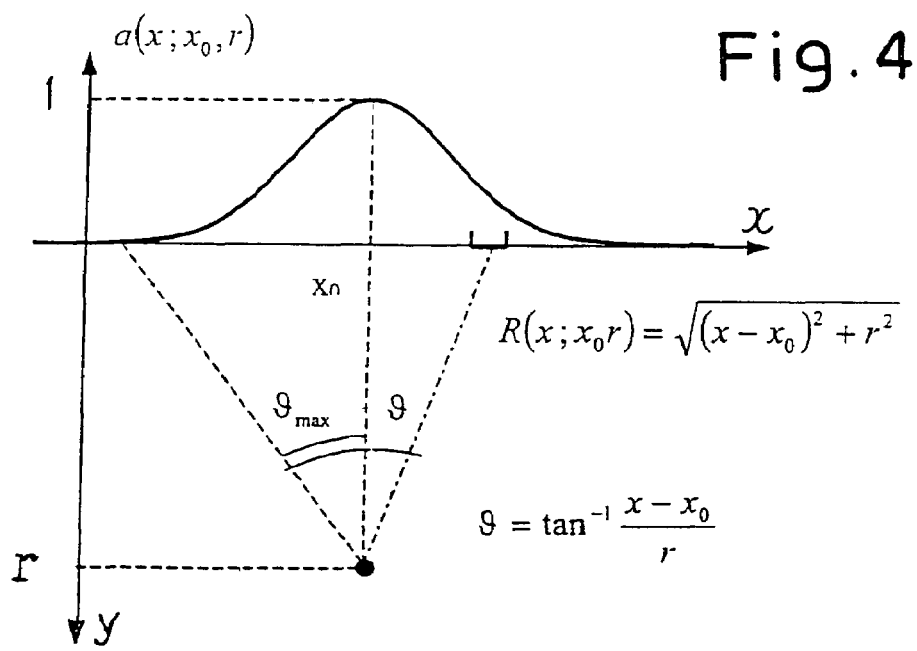
FIG. 4 is a diagram showing the indicative pattern of the lateral sensitivity of a single transducer of an array of transducers.

The lateral sensitivity of each transducer forming the array has a bell-shaped pattern with a maximum at the level of its axis and a pattern decreasing to zero along the transverse direction, as represented in FIG. 4.

A reflector P1 with point, i.e. infinitesimal, dimensions, located in the volume being investigated and which is hit by the wave front generated by a single transducer Tr placed in the position $x_0$ generates an echo that is received by the individual transducers of the linear array that see the reflector P1 within an angle $\theta_{max}$.

The signal received by transducers that see the reflector P1 below an angle greater than $\theta_{max}$ is supposed null, that is the sensitivity is assumed null outside this angle. Assuming to work with continuous quantities, not yet sampled, the image generated by the reflector P1 on the array of transducers Tr can be analytically expressed as $$img(x, t; x_0, r) = a(x; x_0, r)inv\left(t - \frac{2}{c}R(x; x_0, r)\right) \cdot \qquad (1)$$
$$\cos\left(2\pi\left(f_T + \frac{\Delta f}{2T}\left(t - \frac{2}{c}R(x; x_0, r)\right)\right)\right.$$
$$\left.\left(t - \frac{2}{c}R(x; x_0, r)\right) + \phi_0\right)$$

where:

x is the coordinate relative to the main direction of the array, that is the direction along which the array of transducers extends;

t is time $x_0$ and r identify the position of the reflector P1 in the transverse direction (along x) and in depth (along the y coordinate in FIG. 4)

Figure 5:
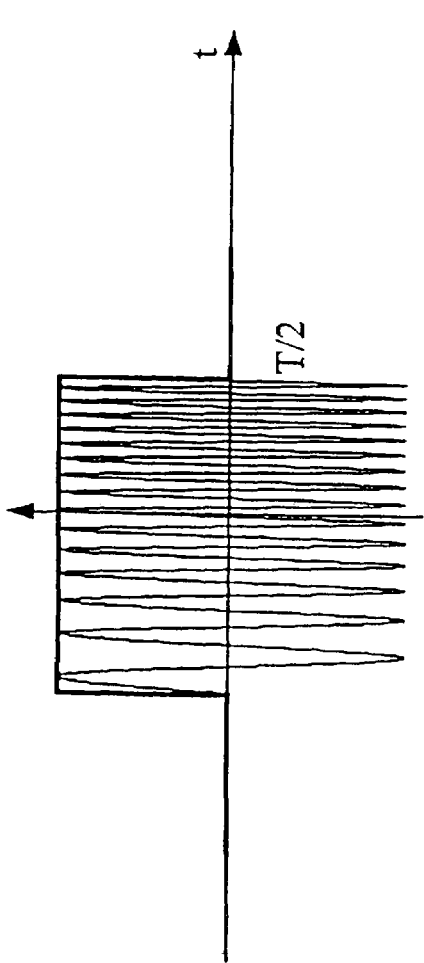
FIG. 5 shows the indicative pattern of the envelope of a linearly frequency modulated signal, emitted by a transducer.

$a(x,x_0,r)$ is the function of lateral sensitivity of each individual transducer Tr of the probe. This sensitivity is represented in FIG. 4 by the bell-shaped curve representing the sensitivity of the transducer disposed in position $x_0$. This is a function of $x_0$, r and x as the sensitivity of the transducer in the generic position x to the signal reflected from the reflector P1 depends on the position in which the transducer that emitted the excitation ultrasonic signal is located and on the depth at which the reflector P1 is located, said depth being a direct function of the time t passing between the emission time of the excitation signal and the receive time of the signal reflected from the generic transducer in position x;

inv(t) is the envelope of the transmitted ultrasonic pulse. Depending on the systems utilized it may be a bell-shaped or rectangular window, in any case it is assumed to be zero everywhere except in the interval [−T/2, T/2]. FIG. 5 shows an example of a wave form of the excitation signal, which may be used. In this case the envelope has a rectangular shape;

c is the speed of the ultrasonic wave in the propagation medium, in particular in the tissue being investigated;

R is the effective distance between the generic transducer in position x and the reflector P1. It is given by $$R(x;x_0,r)=\sqrt{(x-x_0)^2+r^2}$$

$\phi_0$ is the initial phase of the signal, independent from x;

T is the duration of the ultrasonic pulse emitted by the transducer Tr. Typically this duration is around 20 microseconds. This relatively high duration of the signal is due to the fact that in the example illustrated here (as mentioned above) the signal utilized is a frequency modulated signal. In traditional scanners, which use (as will be mentioned hereunder) non-frequency modulated signals, the duration of the signal is much lower, in the region of a microsecond;

$f_T$ is the central frequency of the excitation signal, that is of the ultrasound signal emitted by the transducer in position $x_0$;

$\Delta f$ is the range within which the frequency f of the excitation signal emitted by the transducer in position $x_0$ varies. Therefore, in the time interval T during which the ultrasonic signal is emitted, the frequency of the signal varies from an initial frequency $$f_T - \frac{\Delta f}{2}$$

to a final frequency $$f_T + \frac{\Delta f}{2}.$$

For greater clarity the expression (1) of the signal representing the image received from the array of transducers may be rewritten as:

$$img(x, t; x_0, r) = a(x; x_0, r)inv\left(t - \frac{2}{c}R(x; x_0, r)\right) \cdot \qquad (2)$$
$$\cos\left(2\pi f_T\left(t - \frac{2}{c}R(x; x_0, r)\right) + \right.$$
$$\left.\tilde{b}\left(t - \frac{2}{c}R(x; x_0, r)\right)^2 + \varphi_0\right)$$

having assumed $$\tilde{b} = \pi\frac{\Delta f}{T}.$$

The signal described by expression (2) is a spherical wave, generated by the point reflector P1 and having an influence on the array of transducers forming the probe, that propagates at half the effective speed of the ultrasounds in the means being investigated: processing this signal is equivalent to considering the real situation of the signal that is transmitted by the transducer Tr, influences the reflector P1 and returns at the speed c.

Figure 6:
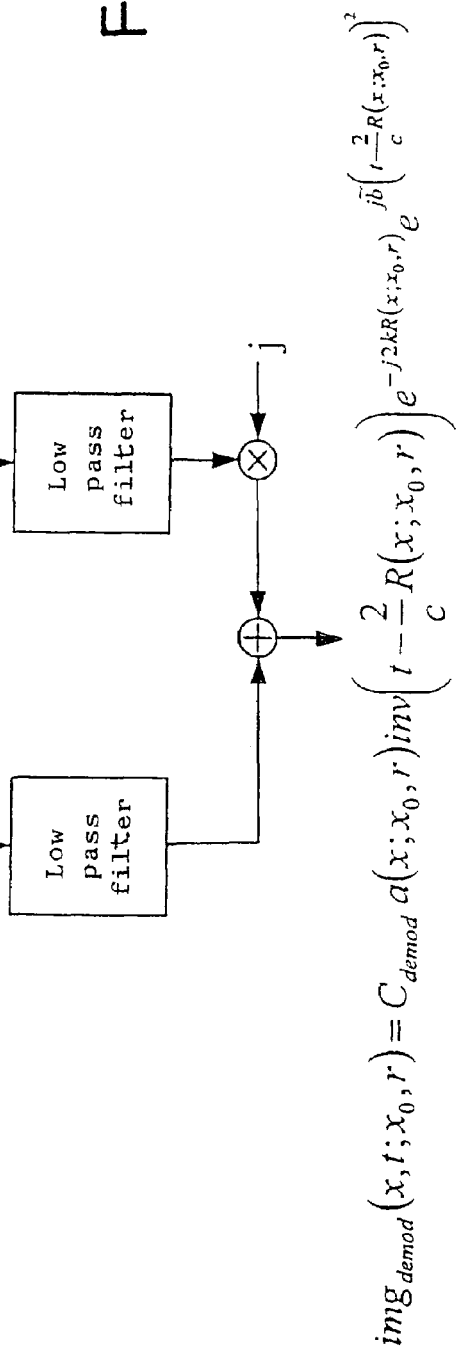
FIG. 6 is a block representation of a coherent demodulator.

In order to be processed, the signal received must be returned to base band by coherent demodulation. This is obtained with after represented in FIG. 6. In substance with this demodulation operation the central frequency is translated to zero and maintaining the information relative to the phase. The signal obtained is expressed by:

$$img_{demod}(x, t; x_0, r) = \qquad (3)$$
$$C_{demod} a(x; x_0, r) inv\left(t - \frac{2}{c}R(x; x_0, r)\right) e^{-j2kR(x;x_0,r)} e^{j\bar{b}\left(t - \frac{2}{c}R(x;x_0,r)\right)^2}$$

Expression (3) uses terms already defined with reference to the previous equations (1) and (2), and also introduces a propagation constant k, equal to or equal to $$\frac{2\pi}{\lambda}$$

or equal to $$2\pi \frac{fT}{c},$$

λ being the wavelength of the ultrasonic wave, and with $$C_{demod} = \frac{1}{2} e^{j\phi_0}.$$

In expression (3) there are two phase contributions represented by two exponential terms: the first is due to the geometry of the problem and depends only on the x coordinate, the second to the frequency modulation of the signal transmitted and depends on both coordinates x and t.

Now that the signal is demodulated, it is advisable to change the time coordinate, t with the spatial coordinate y that represents the distance in the direction of propagation of the ultrasonic wavefront, taking into account that $$t = \frac{2}{c} y,$$

and therefore change from the function inv(t) to $$p(y) = inv\left(\frac{c}{2} t\right)$$

and from the constant $\bar{b}$ to $$b = \frac{4}{c^2} \bar{b}.$$

With this change of coordinates the signal is defined by the expression:

$$pp(x,y;x_0,r) = C_{demod} a(x;x_0,r) p(y - R(x;x_0,r)) e^{-j2kR(x;x_0,r)} e^{jb(y-R(x;x_0,r))^2} \qquad (4)$$

Change from the time coordinate to the spatial coordinate could also be implemented in a previous phase of processing. However, performing this after demodulation is advantageous for the purposes of calculation precision In fact, while the time coordinate is measured by the instrument, the spatial coordinate is obtained from the time coordinate by the space-time link represented by the propagation speed c of the ultrasounds in the medium being investigated. This speed is not known exactly, but only estimated and may vary for example as a function of the type of tissue in which the ultrasonic wave propagates. It is therefore advisable to perform demodulation, which utilizes the trigonometric functions sine and cosine in the time variable t, before changing the coordinates.

As the signal generated by the transducer Tr is a frequency modulated signal with a relatively high duration T, in the range of 10–20 microseconds and therefore does not have the form of a pulse, the signal (4) that reflected from the reflector P1 reaches the array of transducers of the probe S has a high duration and therefore, in the absence of adequate processing, the reflector P1 would be seen, on each trace, as a strip of a length in the direction of the y coordinate proportionate to the duration of the signal emitted by the transducer Tr. It is therefore necessary to compress the signal in depth, that is in the spatial y direction, corresponding to the time coordinate t. Compression of the pulse also comprises a phase and gain compensation operation.

Although it is possible to perform the aforesaid operations for phase and gain compensation and depth compression in the signal in the time domain, the calculation is simplified greatly if performed in the frequency domain. For this purpose the demodulated signal, expressed by equation (4), is subjected to a Fourier transform in depth, that is in the y coordinate. The operation to be performed is expressed by:

$$pP(x, \omega_y; x_0, r) = \int_{-\infty}^{+\infty} pp(x, y; x_0, r) e^{-j\omega_y y} dy \qquad (5)$$

Owing to the complexity of the function pp(x, y; $x_0$, r) (defined by the expression (4)), the integral cannot be processed in explicit form, It is nonetheless possible to approximate the value by applying the Stationary Phase Principle. This principle, also known as Stationary Phase Method, is a technique for approximating integrals of complex functions with a phase that varies much faster than the module. Assuming to know the function f(x), of which the module g(x) and the phase φ(x) are expressed, and wishing to calculate the integral I:

$$f(x) = g(x) e^{j\phi(x)}$$

$$I = \int_{-\infty}^{+\infty} g(x) e^{j\phi(x)} dx$$

it can be shown that this integral is approximated by the expression:

$$I_{PFS} = g(x^*) e^{j\phi(x^*)} \sqrt{\frac{\pi}{|A|}} e^{jsegno(A)\frac{\pi}{4}}$$

where $$x^* \text{ such that } \left.\frac{\partial \phi(x)}{\partial x}\right|_{x=x^*} = 0$$

-continued $$A = \frac{1}{2}\frac{\partial^2 \phi(x)}{\partial x^2}\bigg|_{x=x^*} \neq 0.$$

For analytic study of the principle reference should be made to the following literature:

F. M. Henderson and A. J. Lewis, *Principles and Applications of Imaging Radar*, John Wiley & Sons, New York, 1998

J. C. Curlander and R. N. McDonough, *Synthetic Aperture Radar: Systems and Signal Processing*, John Wiley & Sons, New York, 1991

G. S. Kino, Acoustic Waves: Devices, imaging, and analog signal processing, Prentice-Hall, Englewood Cliffs, N.J., 1987

M. Born and E. Wolf, *Principles of Optics—6th ed.*, Pergamon Press, Oxford, 1980 (appendix III)

E. Chassande-Mottin and P. Flandrin, "On the stationary phase approximation of chrrp spectra", in Proceedings of the *IEEE-SP International Symposium on Time-Frequency and Time-Scale Analysis*, Pittsburgh, Pa., USA, pp. 117–120, 6–9 Oct. 1998

E. Chassande-Mottin e P. Flandrin, "On the Time-Frequency Detection of Chirps", *Applied and Computational Harmonic Analysis*, vol. 6, n. 2, pp. 252–281, March 1999

A. Papoulis, *Signal Analysis*, McGraw-Hill, New York, 1977.

Therefore, applying the stationary phase principle to the problem in question, the calculation provides the following result:

$$pP(x, \omega_y; x_0, r) \approx C_{PFSy} C_{demod} a(x; x_0, r) p\left(\frac{\omega_y}{2b}\right) \quad (6)$$

$$e^{-j2kR(x;x_0,r)} e^{-j\omega_y R(x;x_0,r)} e^{-j\frac{\omega_y^2}{4b}}$$

with $C_{PFSy} = \sqrt{\frac{\pi}{|b|}} e^{jsegno(b)\frac{\pi}{4}}$.

The three exponential terms that appear in expression (6) are phase terms. The linear phase term contains information relative to the position (in the frequency domain) of the reflector, while the quadratic term, which derives from frequency modulation of the signal transmitted by the transducer Tr, must be eliminated by the subsequent depth compression operation. In this way the spectrum of a very narrow pulse in the y direction is obtained, placed at the depth R(x; $x_0$, r). In the same step it is also possible to compensate the complex factor introduced by the constant $C_{PFSy}$ and by the next inverse Fourier transform.

Therefore, multiplying the signal expressed by (6) by the quantity $$\frac{e^{-jsegno(b)\frac{\pi}{4}}}{2\sqrt{\pi|b|}} e^{j\frac{\omega_y^2}{4b}}$$

the new expression is obtained:

$$pP_c(x, \omega_y; x_0, r) = \frac{1}{2|b|} C_{demod} a(x; x_0, r) p\left(\frac{\omega_y}{2b}\right) \quad (7)$$

$$e^{-j2kR(x;x_0,r)} e^{-j\omega_y R(x;x_0,r)}$$

This function represents the signal compressed in depth, that is in the y direction. Finally, an inverse Fourier transform operation in depth is performed. This inverse transform is easy to calculate, now that a simply linear dependence on $\omega_y$ is obtained both for the phase and for the module, while the quadratic term has been eliminated. By performing the inverse transform of (7) the following is obtained:

$$pp_c(x,y;x_0,r) = C_{demod} a(x;x_0,r) p_{IFT}(2b(y-R(x;x_0,r))) e^{-j2kR(x;x_0,r)} \quad (8)$$

where $p_{IFT}(w)$ indicates the inverse Fourier transform of the function p(y). Expression (8) can be rewritten by the substitution $\hat{p}_{IFT}(w) = p_{IFT}(2bw)$:

$$pp_c(x,y;x_0,r) = C_{demod} a(x;x_0,r)$$
$$\hat{p}_{IFT}(y-R(x;x_0,r)) e^{-j2kR(x;x_0,r)} \quad (9)$$

Figure 7:
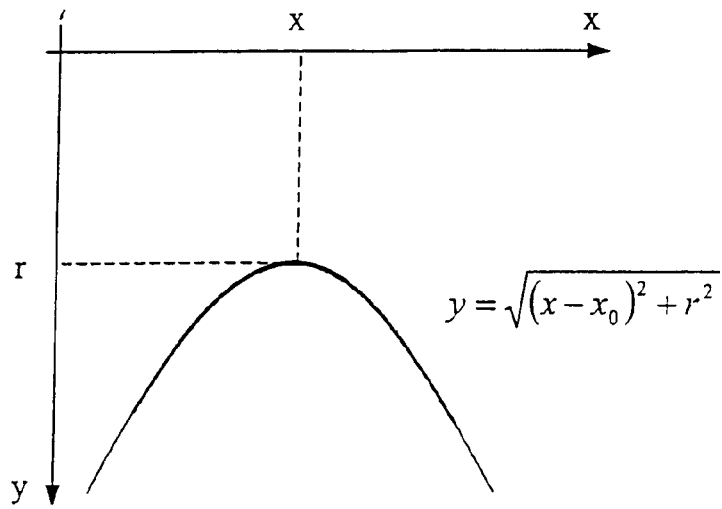
FIG. 7 is a schematic representation of a signal generated by a single reflector, before focusing.

Just as p(y), $\hat{p}_{IFT}(y)$ (inverse transform of p(y)) is also a window centered on zero, but with much smaller dimensions. As $\hat{p}_{IFT}(y)$ is cancelled for all the y values that are not next to zero, it approaches a Dirac delta and expression (9) is essentially null everywhere except on the hyperbola y=R(x;$x_0$,r) weighted by the function a(x;$x_0$;r). This gives an image formed of a single curve, as can be seen in FIG. 7.

Therefore, in substance the depth compression operation, performed in the frequency domain following Fourier transform in y, compresses the signal received by each transducer of the array forming the probe S as signal reflected from the single reflector P1, in a single point of the hyperbola y=R(x;$x_0$,r).

Figure 8:
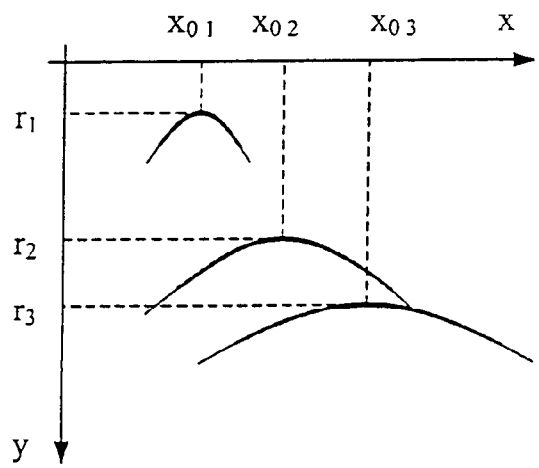
FIG. 8 is a schematic representation of signals generated by three reflectors in the space.

The signal in this form cannot yet be used to reconstruct the image of the volume being investigated. In fact, the single point reflector P1 is represented in it by a hyperbola with the vertex in the position in which the reflector is located. The signal must be subjected to transverse compression, or in the direction parallel to the x axis, that is parallel to the array of transducers of the probe S. Nonetheless, as each reflector generates an image constituted by a branch of hyperbola characterized by a marked curvature, if transverse compression were to take place without further preliminary processing, there would be a loss of depth definition. Moreover, in the spatial domain the branches of hyperbola constituted by the image generated by several point reflectors at different depths have curvatures that increase as the distance from the array of transducers decreases, that is the smaller the r coordinate at which the reflector is located, the more marked the curvatures are. This means that the various hyperbolas generated by several reflectors intersect, thus making it impossible to distinguish the contributions of the different reflectors. This phenomenon is represented schematically in FIG. 8, where three point reflectors P1, P2, P3 are disposed on the plane of the axes of propagation of the main emission lobes of the transducers of the array that extend along the x direction. The coordinates of the three reflectors are indicated with $r_1$, $x_{01}$; $r_2$, $x_{02}$ and $r_3$, $x_{03}$. The three branches of hyperbola generated by the signals reflected from the three reflectors and observed by the array of transducers are indicated with Ip1, Ip2 and Ip3. The curves Ip2 and Ip3 intersect.

Figure 9:
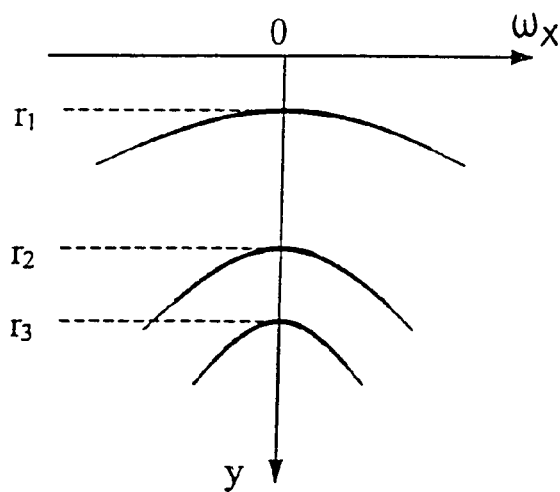
FIG. 9 is a representation of the signals generated by the three reflectors in FIG. 8 in the transformed domain.

Instead, in the frequency domain the aforesaid curves never intersect, as they are disposed along the y axis according to an arrangement with a curvature increasing with y. FIG. 9 shows the signal generated by the same three reflectors in the transformed domain ($\omega_x$; y). The hyperbolas generated by the three reflectors positioned in the coordinate points $r_1$, $x_{01}$; $r_2$, $x_{02}$ and $r_3$, $x_{03}$ in the spatial domain (x, y) are once again indicated with Ip1, Ip2 and Ip3.

Therefore, an operation preliminary to compression in the transverse direction of the signal is the Fourier transform in the transverse direction of the signal compressed in depth represented by expression (9):

$$Pp_c(\omega_x, y; x_0, r) = \int_{-\infty}^{+\infty} pp_c(x, y; x_0, r) e^{-j\omega_x x} dx$$

Just as for the depth transform, the Stationary Phase Principle can also be used to perform the Fourier transform in the transverse direction, from which we obtain:

$$Pp_c(\omega_x, y; x_0, r) \approx C_{PFSx} C_{demod} a\left(-\frac{\omega_x R_\omega(\omega_x; r)}{2k}; r\right) \quad (10)$$

$$\hat{p}_{IFT}(y - R_\omega(\omega_x; r)) \cdot e^{-j2kr\sqrt{1-\frac{\omega_x^2}{4k^2}} - j\omega_x x_0}$$

having defined the new function $$R_\omega(\omega_x; r) = \frac{r}{\sqrt{1 - \frac{\omega_x^2}{4k^2}}} \quad (11)$$

and the quantity $$C_{PFSx} = \sqrt{\frac{r\pi}{2k\left(1 - \frac{\omega_x^2}{4k^2}\right)^{3/2}}} e^{-j\frac{\pi}{4}} \quad (12)$$

The envelope $\hat{p}_{IFT}(y)$ of the signal compressed in depth, which is not null only when next to zero also appears in expression (10) of the transform. Therefore, with high approximation it can be stated that in the transformed domain ($\omega_x$; y) the signal is appreciable only on the curve $y=R_\omega(\omega_x;r)$. This curve is centered on the axis of the angular frequencies ($\omega$) and, besides $\omega_x$, depends only on the value of r.

The curvature of each branch of hyperbola in the transformed domain ($\omega_x$; y) means that the contribution of each reflector is not found at a single depth along the y axis, but on a curve whose depth extension is not negligible. Therefore, it is not possible to perform direct phase compensation for transverse compression. Further processing of the image is first required.

As already mentioned, if several reflectors are present, at different positions in depth (that is with different y coordinates) and in the transverse direction (that is with different $\omega_x$ coordinates), each of these gives rise to a curve that, due to the expression $R_\omega(\omega_x; r)$, has a different curvature to the others and is distinct from these, without superimpositions, as the curvature of the hyperbolas increases with y (FIG. 9). In other terms, only one curve passes for each point of the transformed domain ($\omega_x$; y) notwithstanding the number of point reflectors that generated them.

It is therefore possible to apply a transformation to the image defined by expression (11) to restore each curve, characterized by a certain value of r, to a straight line with y constant (that is parallel to the $\omega_x$ axis of the angular frequencies) and equal to the value of r. By means of the equation $y=R_\omega(\omega_x;r)$ by knowing $\omega_x$ and y it is possible to find r:

$$r = y\sqrt{1 - \frac{\omega_x^2}{4k^2}} \quad (13)$$

The two-dimensional transformation is defined $$\begin{cases} \overline{\omega}_x = \omega_x \\ \overline{y} = y\sqrt{1 - \frac{\omega_x^2}{4k^2}} \end{cases} \quad (14)$$

which applied to the image (10) produces:

$$Pp_c(\overline{\omega}_x, \overline{y}; x_0, r) = C_{PFSx} C_{demod} a\left(-\frac{\overline{\omega}_x R_\omega(\overline{\omega}_x; r)}{2k}; r\right) \quad (15)$$

$$\hat{p}_{IFT}\left(\frac{\overline{y} - r}{\sqrt{1 - \frac{\overline{\omega}_x^2}{4k^2}}}\right) \cdot e^{-j2kr\sqrt{1-\frac{\overline{\omega}_x^2}{4k^2}} - j\overline{\omega}_x x_0}$$

Expression (15) can be simplified, without making significant errors, thanks to the high value of k, considering the following approximations:

$$a\left(-\frac{\overline{\omega}_x R_\omega(\overline{\omega}_x; r)}{2k}; r\right) \approx a\left(-\frac{\overline{\omega}_x r}{2k}; r\right);$$

$$\hat{p}_{IFT}\left(\frac{\overline{y} - r}{\sqrt{1 - \frac{\overline{\omega}_x^2}{4k^2}}}\right) \approx \hat{p}_{IFT}(\overline{y} - r)$$

From which expression (15) can be rewritten as:

$$Pp_c(\overline{\omega}_x, \overline{y}; x_0, r) \approx C_{PFSx} C_{demod} a\left(-\frac{\overline{\omega}_x r}{2k}; r\right) \quad (16)$$

$$\hat{p}_{IFT}(\overline{y} - r) e^{-j2kr\sqrt{1-\frac{\overline{\omega}_x^2}{4k^2}} - j\overline{\omega}_x x_0}$$

It should be noted that the signal (16) is significantly different to zero only in the points with $\overline{y}=r$, disposed on a horizontal straight line in the domain ($\omega_x$; y), i.e. parallel to the axis of the angular frequencies. The curves in FIG. 9 adopt, after this operation, the appearance in FIG. 10, where they are indicated as Im1, Im2, Im3. In substance, the image of each reflector has been "remapped", i.e. it has been "straightened".

Figure 10:
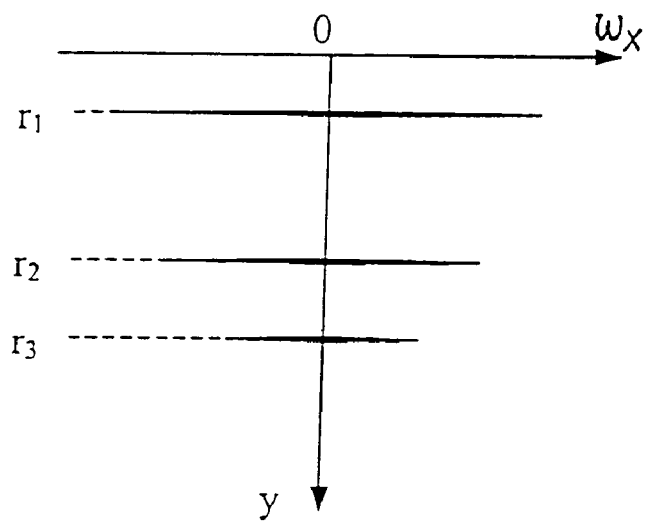
FIG. 10 is the signal generated by the reflectors in FIG. 8 in the transformed domain, after remapping.

As can be understood by observing FIG. 10, with the processing performed until now on the signal generated by a single reflector in the frequency domain an image has been obtained, constituted by a straight line parallel to the axis of the angular frequencies and disposed at a depth (that is at a distance along the y axis) corresponding to the depth at which the reflector is located. That is, the entire contribution generated by a reflector is now located at a single depth, equal to the depth of this reflector. The situation is equivalent to the one existing before depth compression. To obtain the image of the reflectors all that is now required is to compress the image along the axis of the angular frequencies and perform the inverse Fourier transform to return the image to the spatial domain.

It is then possible to compensate the phase and in the same step also compensate the factor introduced by the quantity $C_{PFS_x} C_{demod}$ and by the inverse Fourier transform which will complete processing. Thanks to remapping it is possible to exchange y with r in all points of the image and multiply expression (16) by the quantity:

$$2\sqrt{\frac{r\left(1-\frac{\overline{\omega}_x^2}{4k^2}\right)^{3/2}}{k\pi}} e^{j\frac{\pi}{4}} \cdot e^{j2k r\left(\sqrt{1-\frac{\overline{\omega}_x^2}{4k^2}}-1\right)} \quad (17)$$

to compensate phase and gain, from which the new signal is obtained:

$$P_c p_c(\overline{\omega}_x, \overline{y}; x_0, r) = \frac{r}{2k} a\left(-\frac{\overline{\omega}_x r}{2k}; r\right) \hat{P}_{IFT}(\overline{y}-r) \quad (18)$$
$$e^{-j2kr-j\overline{\omega}_x x_0} \cdot e^{j\phi_0}$$

Phase and module depend linearly on $\overline{\omega}_x$. This allows exact calculation of the inverse Fourier transform, from which the following expression is obtained:

$$p_c p_c(\overline{x}, \overline{y}; x_0, r) = a_{IFT}\left(-\frac{2k}{r}(\overline{x}-x_0); x_0, r\right) \quad (19)$$
$$\hat{p}_{IFT}(\overline{y}-r) e^{-j2kr} \cdot e^{j\phi_0}$$

where $a_{IFT}(w; x_0, r)$ indicates the inverse Fourier transform of the function of lateral sensitivity $a(x; x_0, r)$. This is also a bell-shaped function, analogous to the function of lateral sensitivity, but much narrower on zero. It may therefore be considered a close approximation of a Dirac delta.

Figure 11:
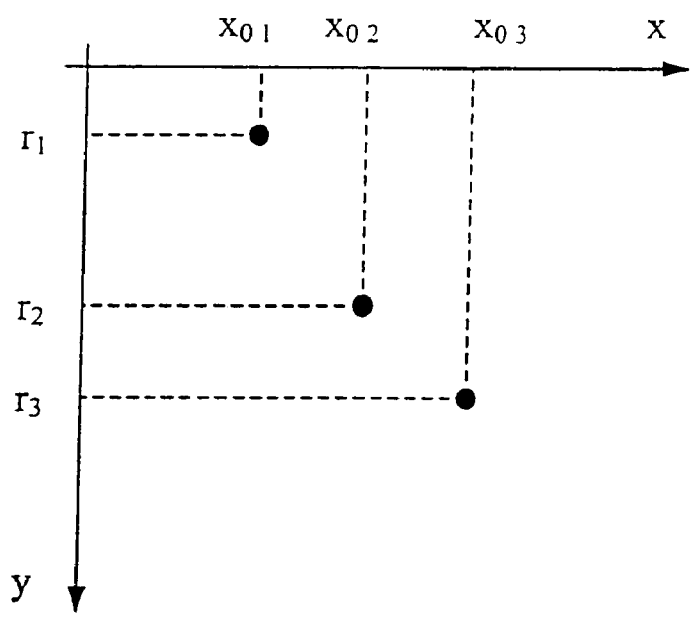
FIG. 11 is the signal generated by the three reflectors in FIG. 8 after the inverse transform in the transverse direction.

From the image described by expression (1) or by expression (2) equivalent to it, in which a single reflector gave rise to a curve with dimensions comparable to those of the image, it has thus been obtained an image, generated by expression (19), that is null everywhere except in proximity to the point $(x_0; r)$ that coincides with the position of the reflector in the space investigated by means of the probe S. The image has therefore been correctly focused. Considering the three reflectors that initially give the image in FIG. 8, after processing these the image represented schematically in FIG. 11 is obtained. It should also be noted that the initial phase $\phi_0$ remains unchanged throughout processing.

Figure 12:
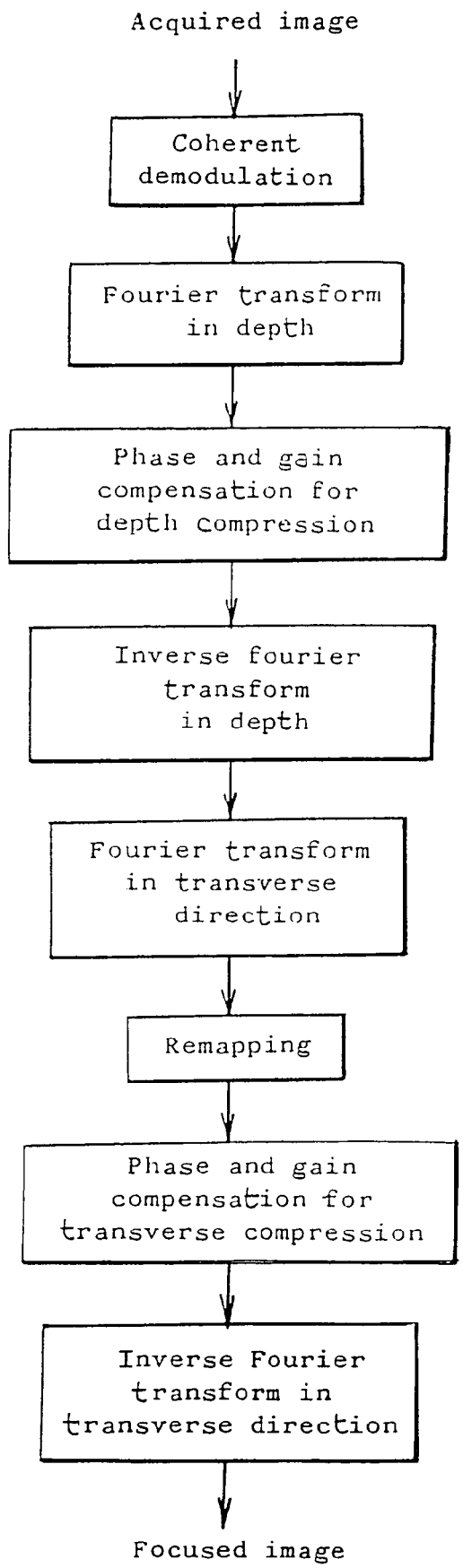
FIG. 12 is a block diagram summarizing the method according to the invention in an embodiment using a frequency modulated signal.

The entire processing procedure is represented schematically and summarized in the block diagram in FIG. 12. The ultrasound image is obtained by exciting in sequence all the transducers forming the array of transducers of the probe and receiving, in sequence with each transducer, the reflected signal. After receiving the signals defining the entire ultrasound image, the procedure analytically described above is performed on it, comprising pulse compression in the two directions performed on the entire image.

The processing described is performed in this form when the ultrasound signal is constituted by a signal of a relatively high duration and with modulated frequency, for example with a linear modulation, that is a so-called chirp signal. As the processing indicated above shows, this makes it possible to obtain high signal energies, noteworthy penetration depths and excellent image definition.

Nonetheless, scanners currently available on the market use as excitation signal short pulses which are non-frequency modulated. In this case processing is much simpler although the quality of the image obtained is inferior. To adapt the algorithm described above to this type of signal, it is sufficient to eliminate the three steps of depth compression of the signal (Fourier transform in depth, compensation, inverse Fourier transform). The algorithm assumes the form summarized in the block diagram in FIG. 13.

From a mathematical viewpoint, the expression of the signal that constitutes the starting point in this case simplified is no longer given by equation (2), but by $$img(x, t; x_0, r) = \quad (20)$$
$$a(x; x_0, r) inv\left(t-\frac{2}{c}R(x; x_0, r)\right) \cos\left(2\pi f_T\left(t-\frac{2}{c}R(x; x_0, r)\right)+\phi_0\right)$$

This expression differs from expression (2) due to the absence of the term in which the frequency modulation Δf appears and the different expression of the function inv(y), which describes the envelope of the ultrasonic signal transmitted: in general this window is much narrower than the previous case and equivalent to one or a few cycles of the ultrasound and it approaches a Dirac delta. All the other functions and constants coincide with the case presented above.

From coherent demodulation and from the transition from the time coordinate to the y coordinate, we obtain:

$$pp(x,y;x_0,r)=C_{demod} a(x;x_0,r) p(y-R(x;x_0,r)) e^{-j2kR(x;x_0,r)} \quad (21)$$

On this signal the same considerations can be made on the module as those made for the signal represented by expression (9), from which it differs only in the function p(y) that appears in place of $\hat{p}_{IFT}(y)$.

Starting from expression (21) the same steps mentioned previously can be repeated to finally obtain:

$$p_c p(\overline{x}, \overline{y}; x_0, r) = a_{IFT}\left(-\frac{2k}{r}(\overline{x}-x_0); r\right) p(\overline{y}-r) e^{-j2kr} \cdot e^{j\phi_0} \quad (22)$$

Once again it is noted that the only difference from the previous case is the function p(y) in place of $\hat{p}_{IFT}(y)$.

2. Experimental Results: General Considerations

Figure 13:
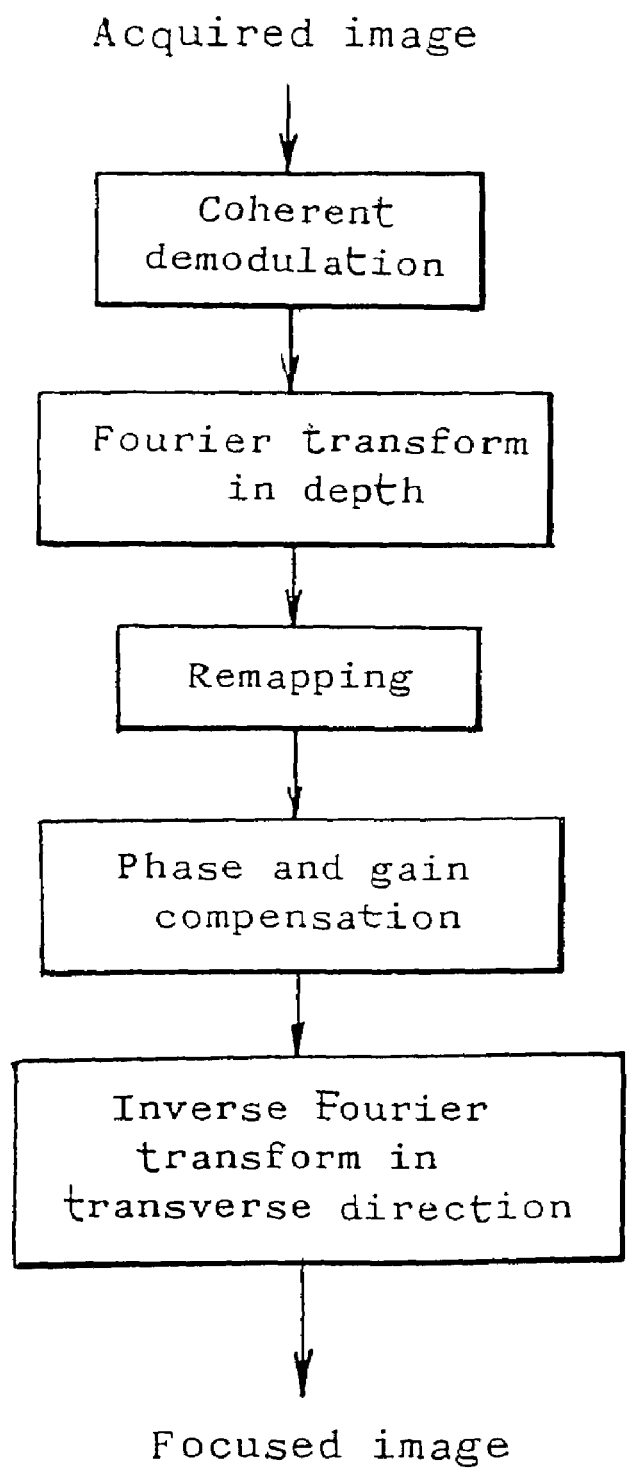
FIG. 13 is the same diagram in the case of non-frequency modulated signals.

Functioning of the method described above was verified on real acquisitions, performed both by transmitting frequency modulated signals, and with the normal pulse transmitted by the scanner. In the first case the complete algorithm (FIG. 12), was applied, in the second the version for non-modulated signals (FIG. 13). A first series of tests reconstructed the ultrasound image of a taut metal wire in water, in a direction orthogonal to the plane of the image. In a second series of tests a so-called sample object was used, which simulates reflectors located in real tissue to be analyzed with the ultrasound technique. These were compared with the same tests performed using a scanner operating with a traditional focusing system.

Signals coming from 250 traces and 4096 points per trace were recorded. Each pixel of the images presented corresponds to 0.18 mm in the transverse direction and 18.75 μm in depth; the images processed correspond to sections 4.5 cm in width and 7.68 cm in depth.

In the images referred to hereunder the probe of the scanner is on the upper side of each ultrasound image presented. As indicated on the axes, the y coordinate corresponds to the depth, the x coordinate to the transverse direction, that is parallel to the length of the array of the probe.

Figure 14:
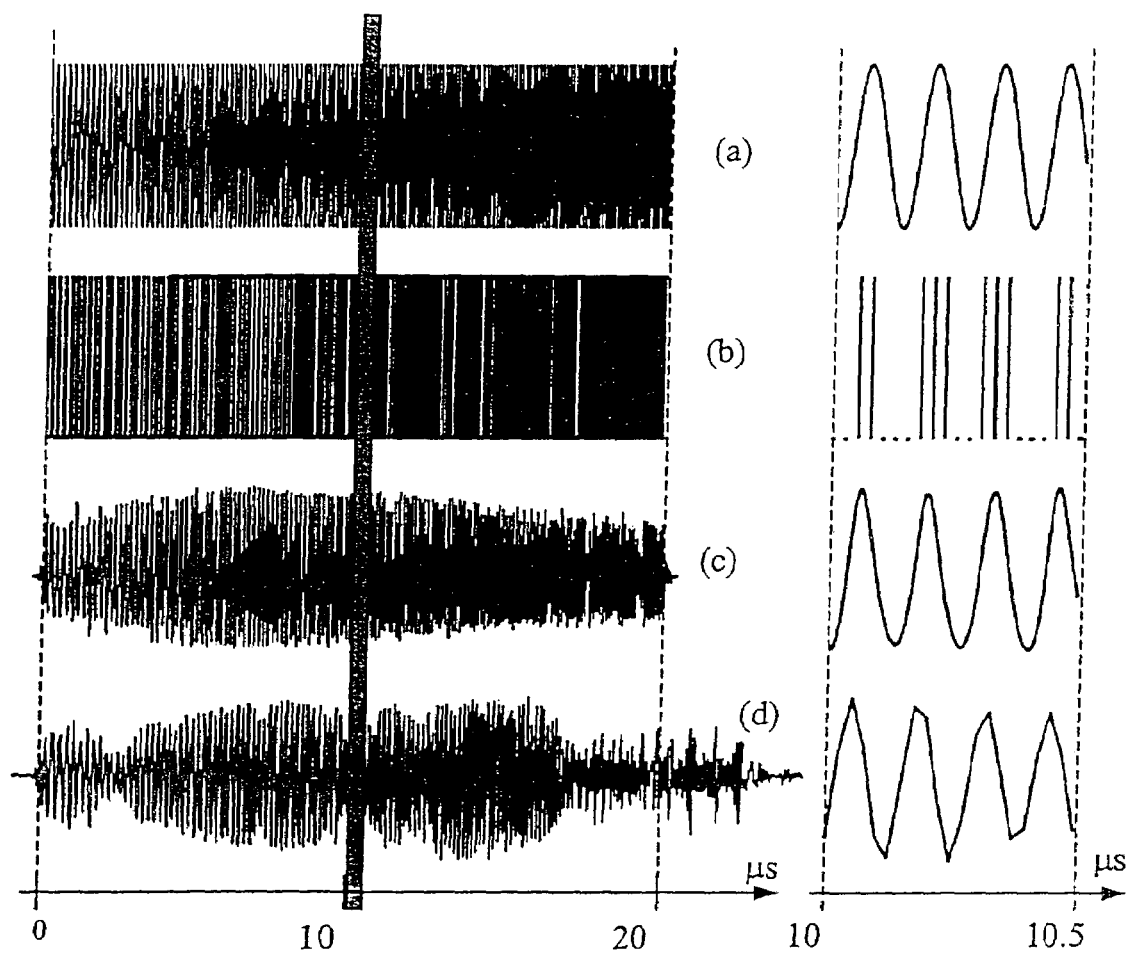
FIG. 14 shows the chirp signals used for experimental tests.

In the tests performed with the frequency modulated signal an ultrasonic signal with a duration of 20 μs linearly frequency modulated from 5 MHz to 10 MHz was used. To generate it, an ideal signal was sampled at 40 MHz and 1 bit. The scanner was reprogrammed to excite the probe with this sequence. Thanks to the limited band of the piezoelectric transducers of the probe, the electric signal with square waveform becomes a sinusoidal ultrasound signal which is very close to the ideal one. FIG. 14 shows the signals used, for each of which an enlargement of the portion highlighted in the diagram on the left is shown on the right of the figure. More specifically, FIG. 14(a) shows the ideal chirp-signal; FIG. 14(b) shows the sampling at 40 MHz and 1 bit of the signal in FIG. 14(a); FIG. 14(c) shows the signal effectively transmitted by the ultrasound probe and FIG. 14(d) shows the signal received by the probe after reflection on a thread immersed in water (the object used for the first series of tests). Due to multiple reflections at different depths, the signal received is also slightly longer than the one transmitted.

The transmitted ultrasonic signal shown in FIG. 14(c) was measured with a membrane hydrophone, type 699/1/00002/200 produced by Marconi-caswell, and a Tektronix TDS 520C oscilloscope. It can be noticed that this signal is similar to the initial one, with the exception of an amplitude modulation due to the fact that the band of the probe is not flat. The reflected signal was obtained by pointing the probe towards the metal thread and acquiring the signal through the scanner. Reflection of the ultrasounds and travel of the electric signal through the receive stages worsen amplitude modulation of the signal. Instead, frequency modulation remains unvaried through the entire route of the signal. As described in detail above the first step of the processing method coherently demodulates the signal using the central frequency of modulation, in this specific case 7.5 MHz.

In the series of tests performed with the pulse normally transmitted by the scanner, the signal that excites the probe is a single square wave cycle at the frequency of 6.67 MHz, which therefore has a duration of 150 ns and is sufficiently narrow to excite the probe on all the available band. The ultrasound transmitted follows the electric pulse sent to the probe reasonably well. Instead, the signal received is much longer than the previous one and has a component with a lower frequency than the excitation frequency, around 4.2 MHz. In coherent demodulation of the second series of tests this second frequency was used to return the signal to the base band. FIG. 15 shows the signals in this second case. More specifically, FIG. 15(a) shows the excitation electric signal of the probe, FIG. 15(b) shows the ultrasonic signal transmitted, measured with the hydrophone, and FIG. 15(c) shows the signal received, acquired by the scanner, constituted by the echo generated by the metal thread.

3. Experimental Results: Image of a Thread Immersed in Water

In a first series of tests the ultrasound probe was disposed perpendicularly to a tinned copper thread, with a diameter of 0.5 mm, taut in water, so that the scanner detected the section. The diameter of the thread can be compared to the distance between two adjacent elements of the array of transducers of the probe, which in this specific case is 0.18 mm. From this it can be foreseen that the section of the thread, should be contained in a maximum of three ultrasound traces, if this is correctly focused in the transverse direction.

Figure 16A:
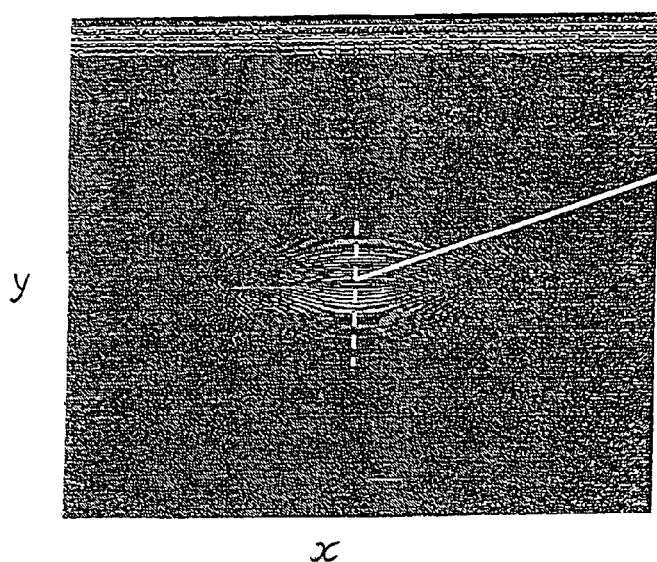
FIG. 16($a$) shows a real image acquired by the scanner of a taut thread in water.
Figure 16B:
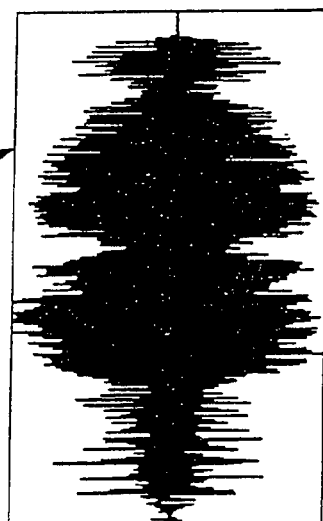

Ultrasounds propagate in water at a speed of around 1500 m/s; therefore, they have a wavelength of 0.3 mm at a frequency of 5 MHz and of 0.15 mm at 10 MHz. The diameter of the thread is slightly greater than the wavelength. This means that only the upper part of the thread reflects the incident sound wave in an appreciable manner. Therefore, the thread, already per se small, behaves in a very similar way to an infinitesimal reflector. FIG. 16(a) shows the signal, recorded by the scanner, of the aforesaid thread. The thread is positioned in the center of the pattern and the ultrasound probe is disposed with its array of transducers along the upper edge of the image. As can be seen in FIG. 16(a), the thread generates a fringed image both in the transverse direction, that is along the x axis, and in the direction of depth, that is in the y direction. FIG. 16(b) shows an enlargement of the center trace of the pattern, passing through the thread.

Figure 17A:
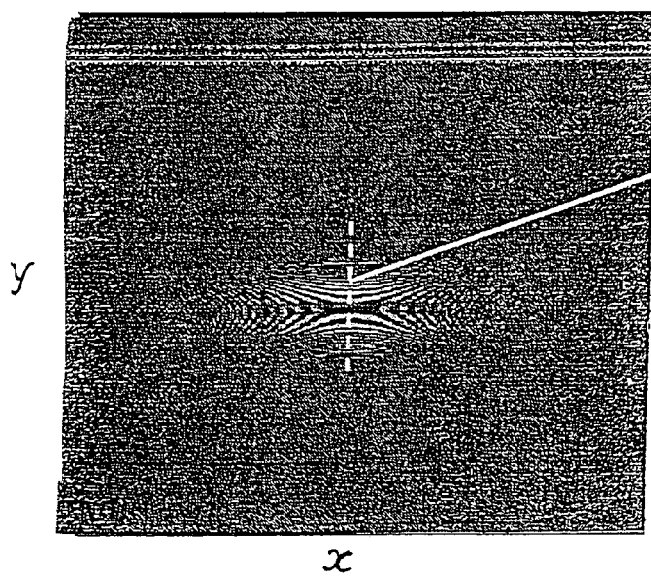
FIG. 17($a$) shows the real part of the image in FIG. 16($a$) coherently demodulated.
Figure 17B:
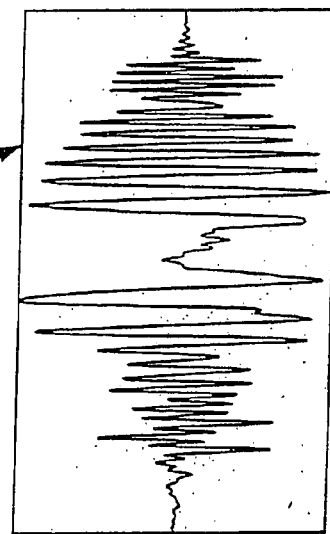

The first processing operation on the signal that provides the image in FIG. 16(a), coherent demodulation, provides the result in FIG. 17(a), which represents the real part of the coherently demodulated image. FIG. 17(b) shows an enlargement of the center trace of the pattern.

Figure 19A:
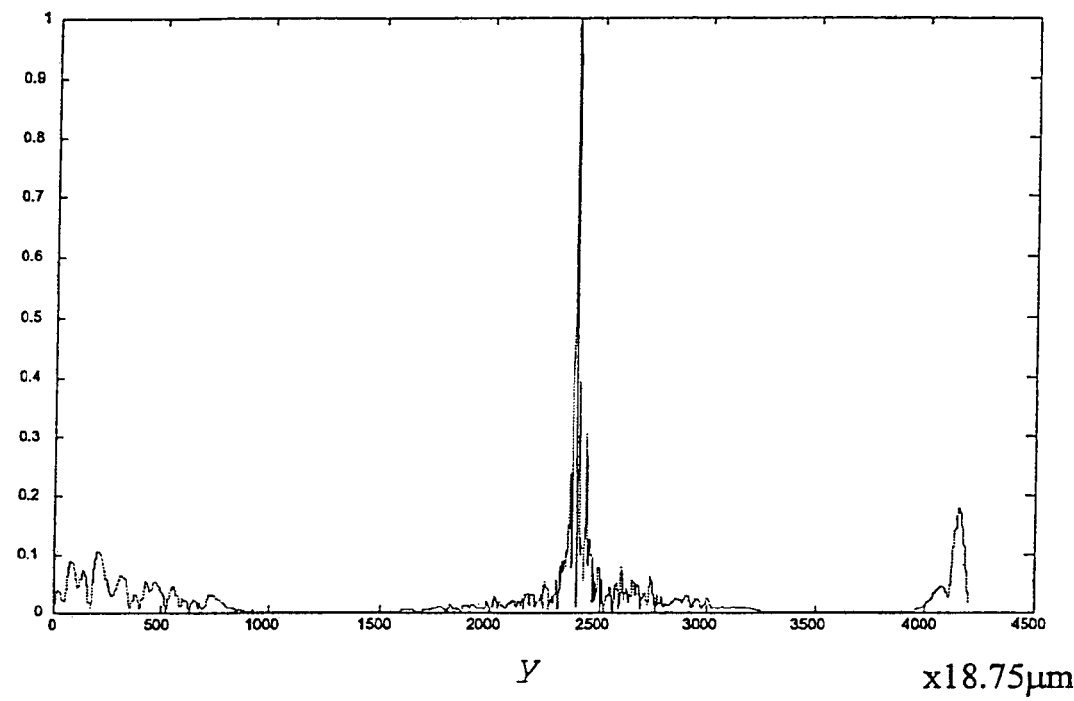
FIG. 19($a$) shows the pattern of the module of the trace highlighted in the image in FIG. 18($a$), normalized to 1.
Figure 19B:
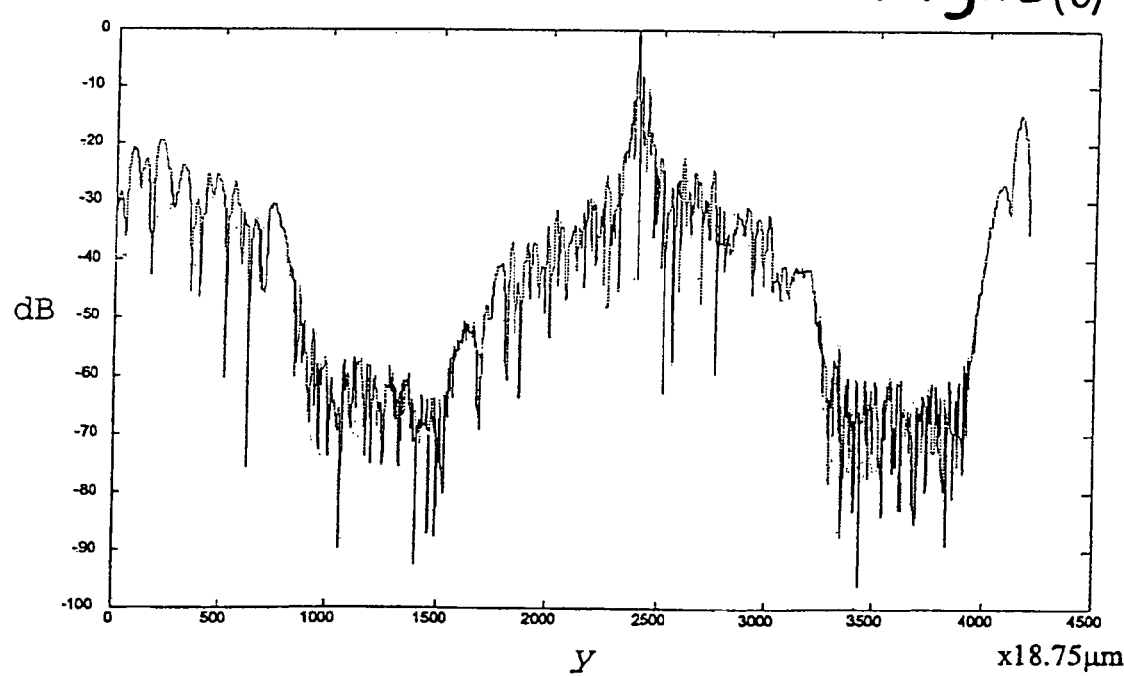

The subsequent operation performed on the coherently demodulated image is depth compression or focusing, that is in the y direction the results of which can be seen in FIG. 18(a) and in an enlargement in FIG. 18(b), which shows the module of the depth focused image. FIGS. 18(a) and 18(b) show how compression of the pulse in the y direction has effectively functioned, generating an image represented essentially by a branch of hyperbola with the vertex at the level of the point in which the thread is located. FIG. 19(a) shows the module of the trace highlighted in FIGS. 18(a) and 18(b), normalized at 1 and FIG. 19(b) shows the same module normalized and presented in logarithmic scale. In FIG. 19(b) it can be observed that the duration of the depth compressed signal is of around 15 traces, considering a dynamic of 6 dB.

Figure 20:
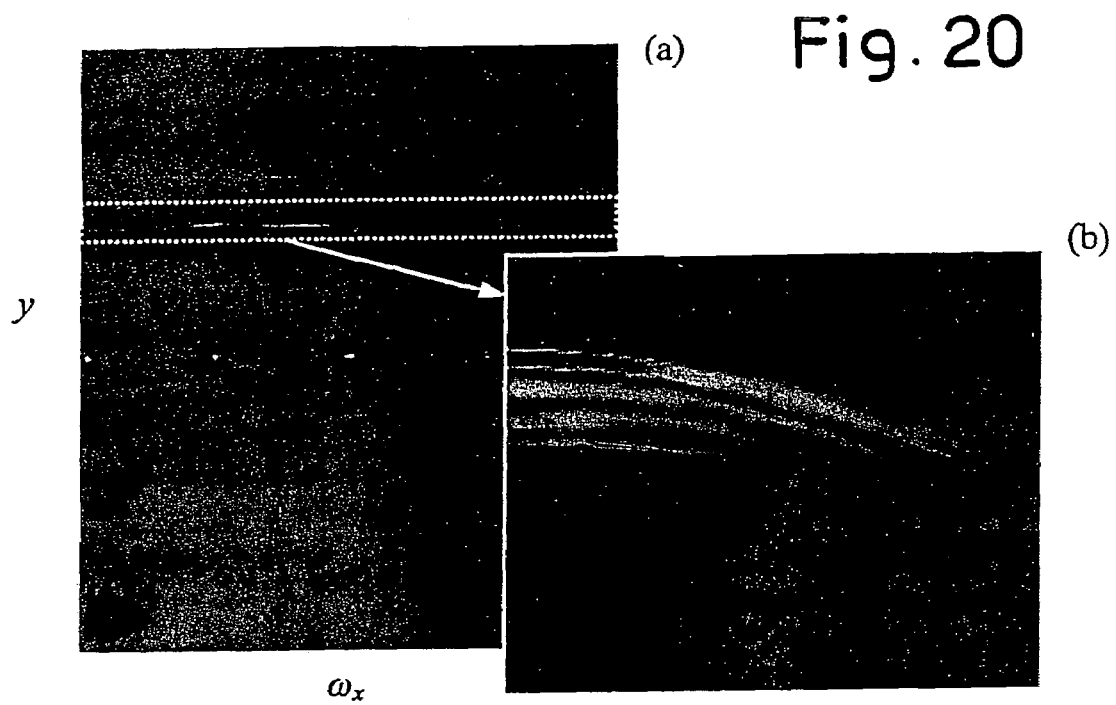
FIG. 20($a$) shows the module of the Fourier transform in the transverse direction of the image focused in depth in FIG. 18($a$)
Figure 21:
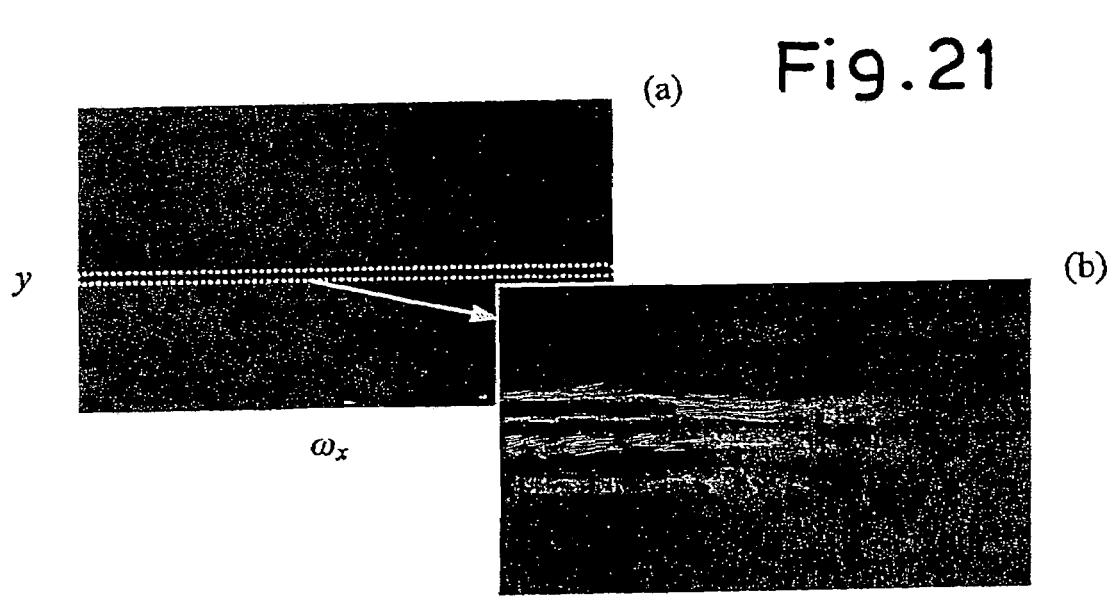
FIG. 21($a$) shows the image in FIG. 20 after remapping.
Figure 22A:
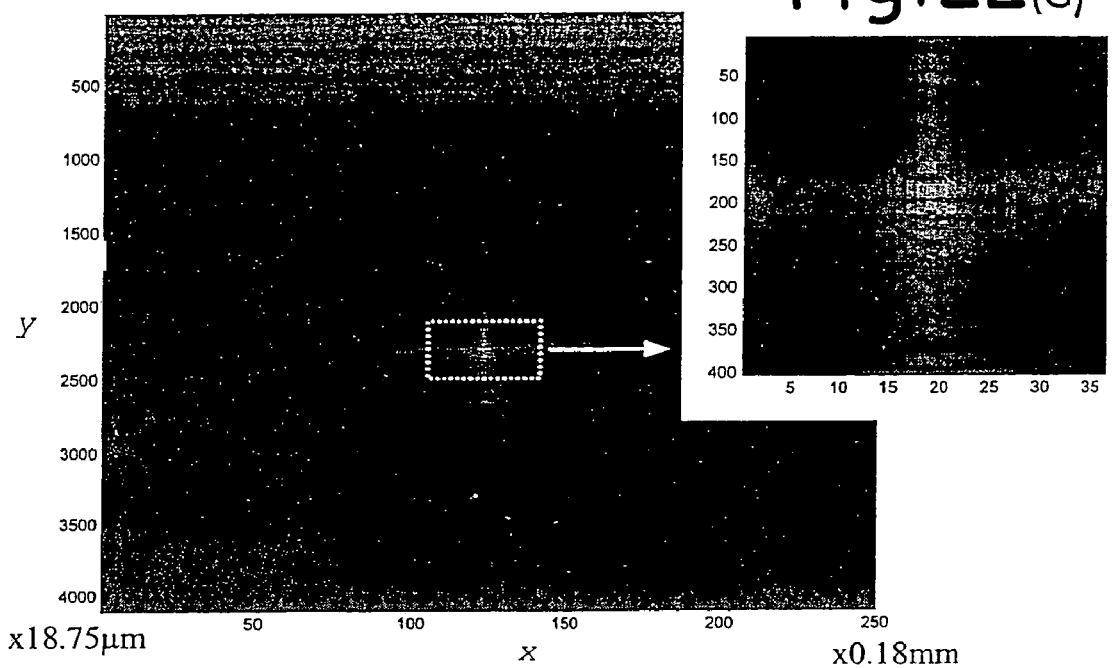
FIG. 22($a$) shows the module of the focused image.
Figure 22B:
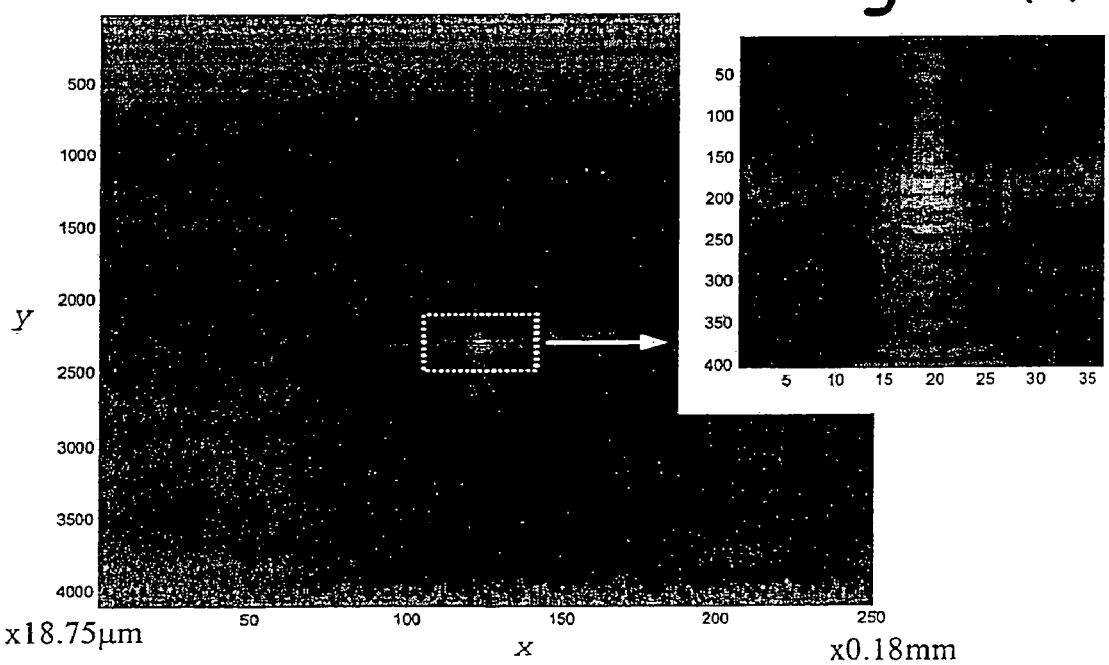
Figure 23A:
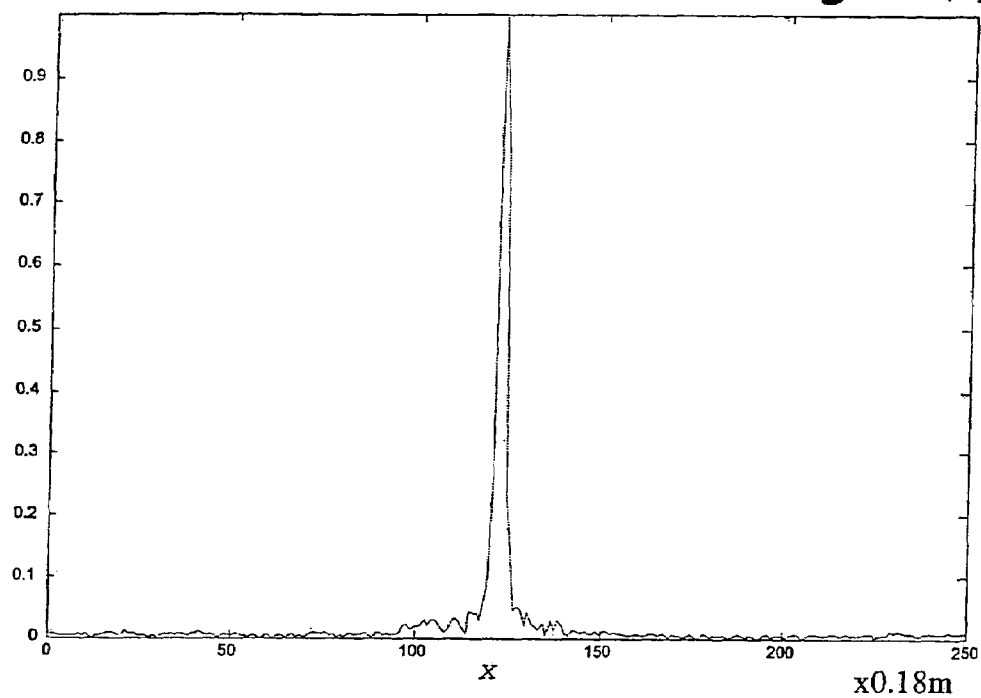
FIG. 23($a$) shows the module of the horizontal trace, centered on the thread, on focused image normalized to 1.
Figure 23B:
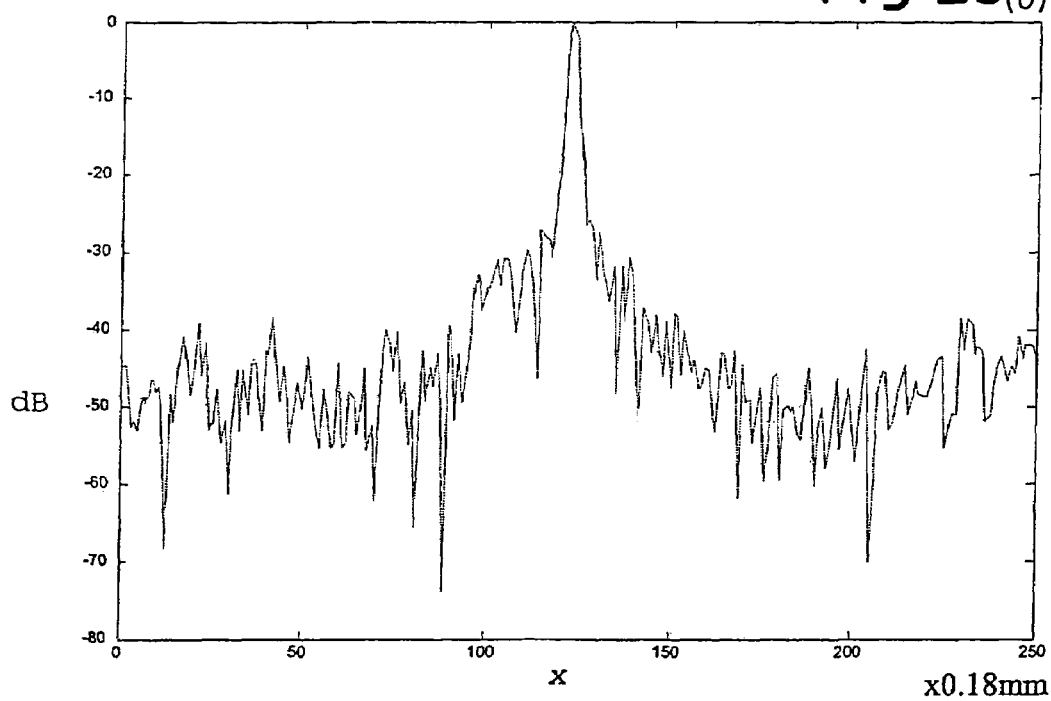

After performing depth focusing or compression, that is in the y direction, the image is subjected to the remapping operation, after Fourier transform in the transverse direction, that is in the x direction. FIGS. 20(a) and 20(b) show the module of the Fourier transform of the image compressed in depth, FIG. 20(b) being an enlargement of a portion of FIG. 20(a). As can be seen in particular in FIG. 20(b), the spectrum generated by the thread has a marked curvature. These images are remapped through the transformation expressed by equations (14). FIGS. 21(a) and 21(b) (the latter being an enlargement of a portion of the former) show the image obtained after remapping: the curvature of the image has now been practically eliminated and the contribution generated by the thread is returned to a single depth, that is it is corrected to form an image essentially parallel to the x direction. The image thus obtained is compressed, that is focused, in the transverse direction and the inverse Fourier transform is performed on it. The result of this further processing is shown in FIG. 22(a), which gives the module of the focused image. The section of the thread is concentrated in three traces, as can be seen in particular in the enlargement shown in the square on the right of the image. The grey scale is linear. FIG. 22(b) again shows the module of the image, with a logarithmic grey scale. From black to white the most significant 45 dB are shown. The square on the right is an enlargement of a center portion of the image, corresponding to the position of the thread. FIGS. 23(a) and 23(b) show the module of the horizontal trace, centered on the thread, of the focused image, normalized at 1, in linear scale and logarithmic scale respectively.

Figure 24:
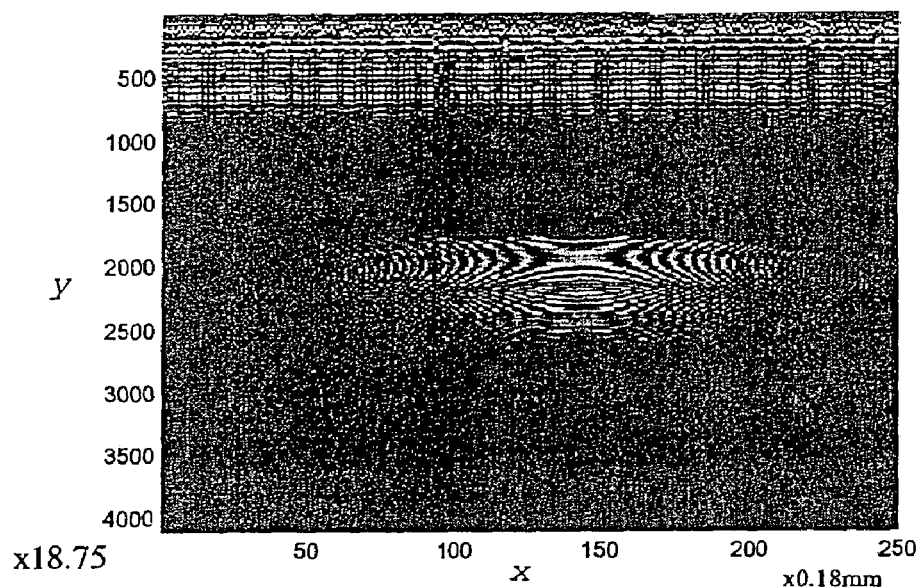
FIG. 24 shows the real signal acquired by the scanner, generated by two taut threads in water, one metal and the other nylon.
Figure 25:
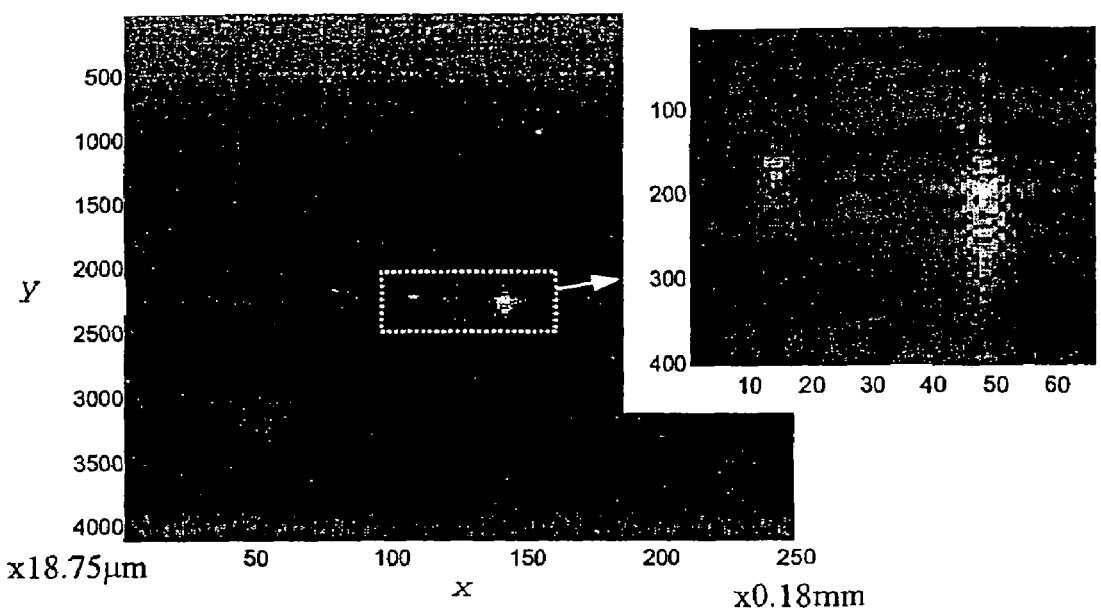
FIG. 25 shows the module of the image in FIG. 24 after focusing, with an enlargement of a detail.
Figure 27A:
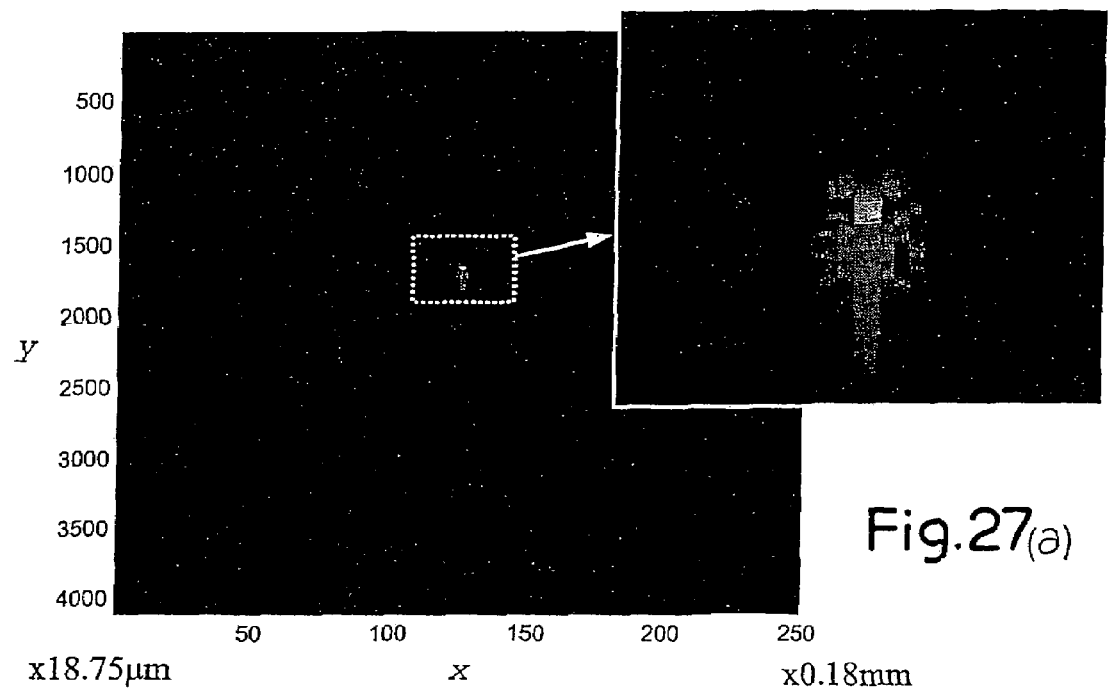
FIG. 27($a$) shows the module of the image in FIG. 26 after focusing, in a linear grey scale.
Figure 27B:
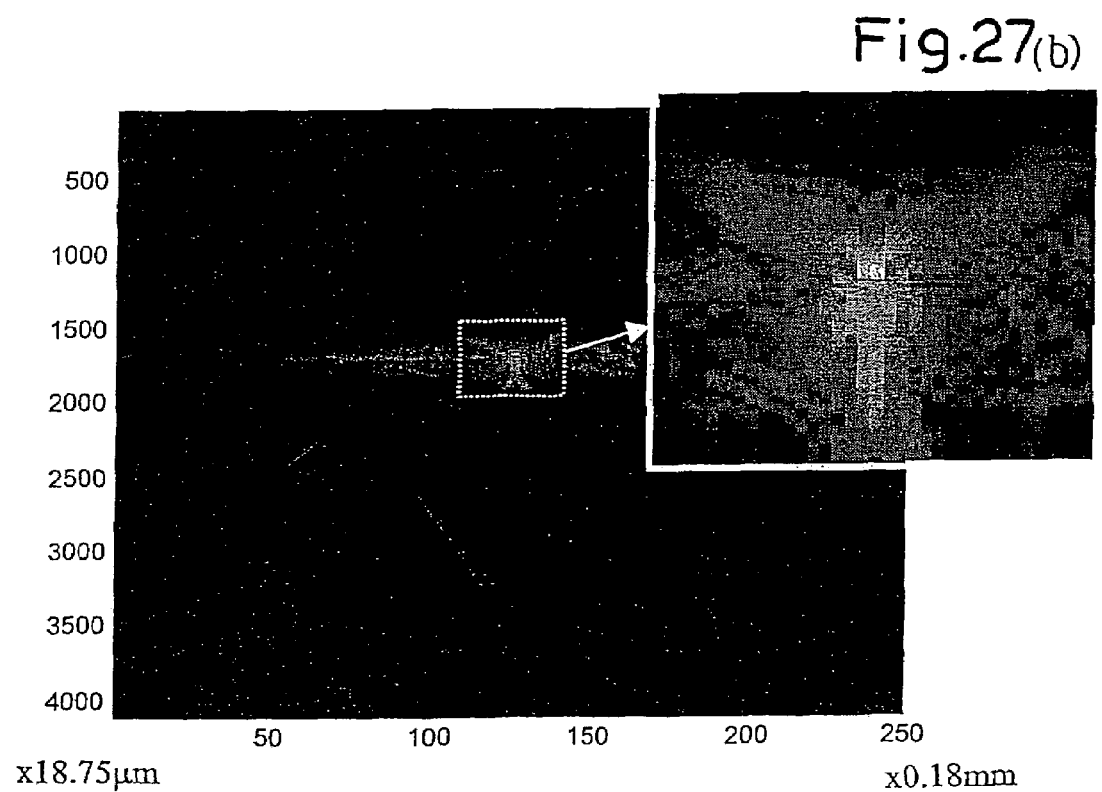
Figure 28A:
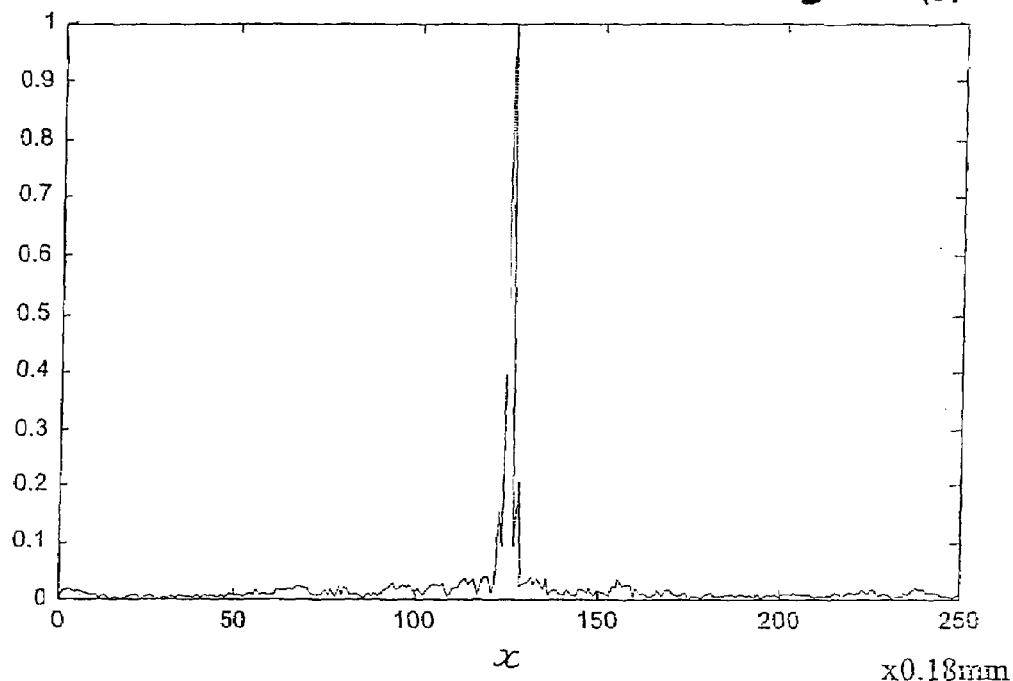
FIG. 28($a$) shows the module of the horizontal trace, centered on the thread, of the focused image in FIG. 27, normalized to 1.
Figure 28B:
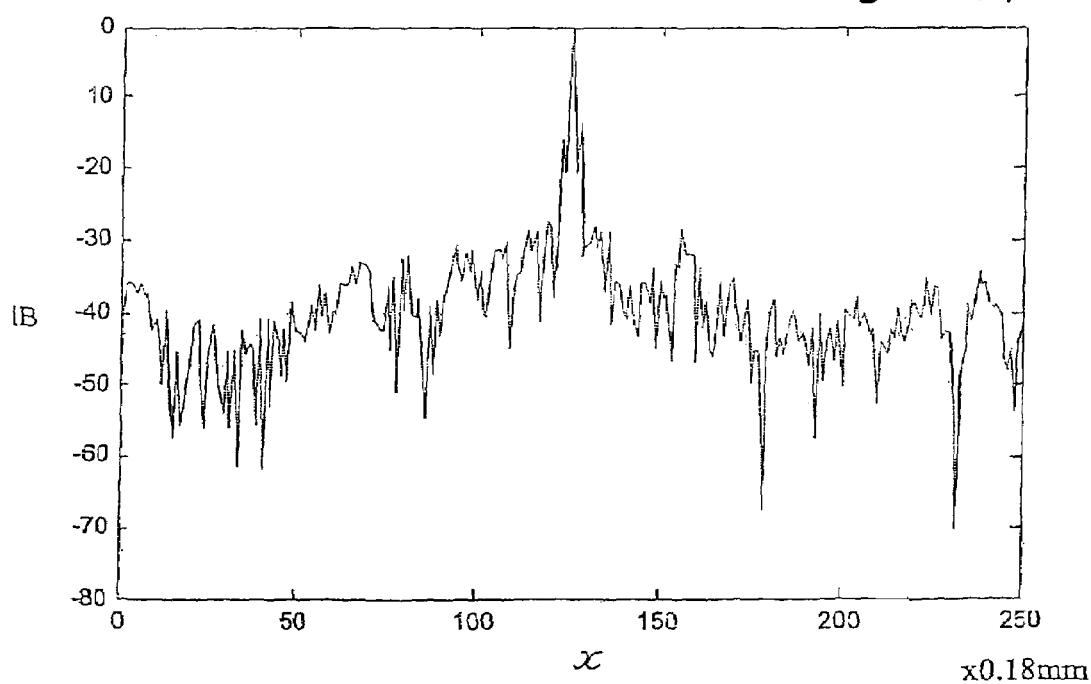

FIGS. 24 and 25 show the real signal, acquired by the scanner, and the module of the focused image with a logarithmic grey scale, of an image analogous to the previous one where, a further nylon thread with a diameter of 0.1 mm has been disposed on the left of the metal thread with a diameter of 0.5 mm. As the nylon thread is smaller and made of a different material, it reflects the ultrasounds in a smaller quantity than the metal thread and appears smaller in the focused image in FIG. 25.

Figure 29A:
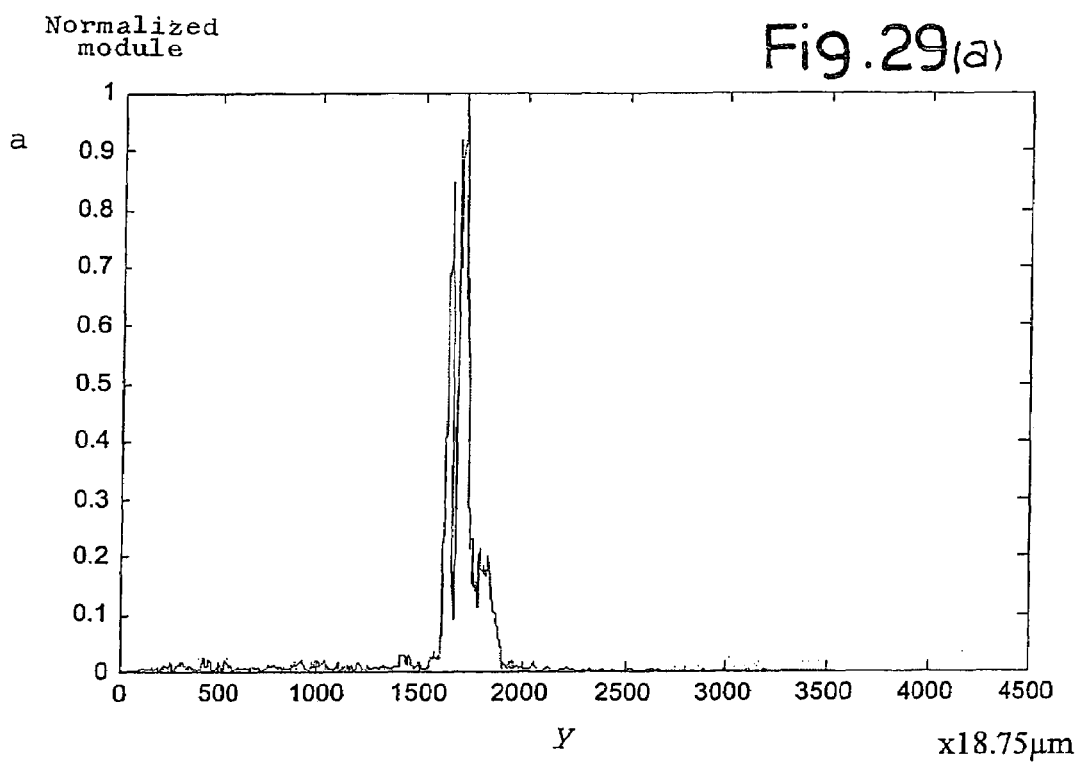
FIG. 29($a$) shows the module of the vertical trace centered on the thread of the focused image in FIG. 27, normalized to 1.
Figure 29B:
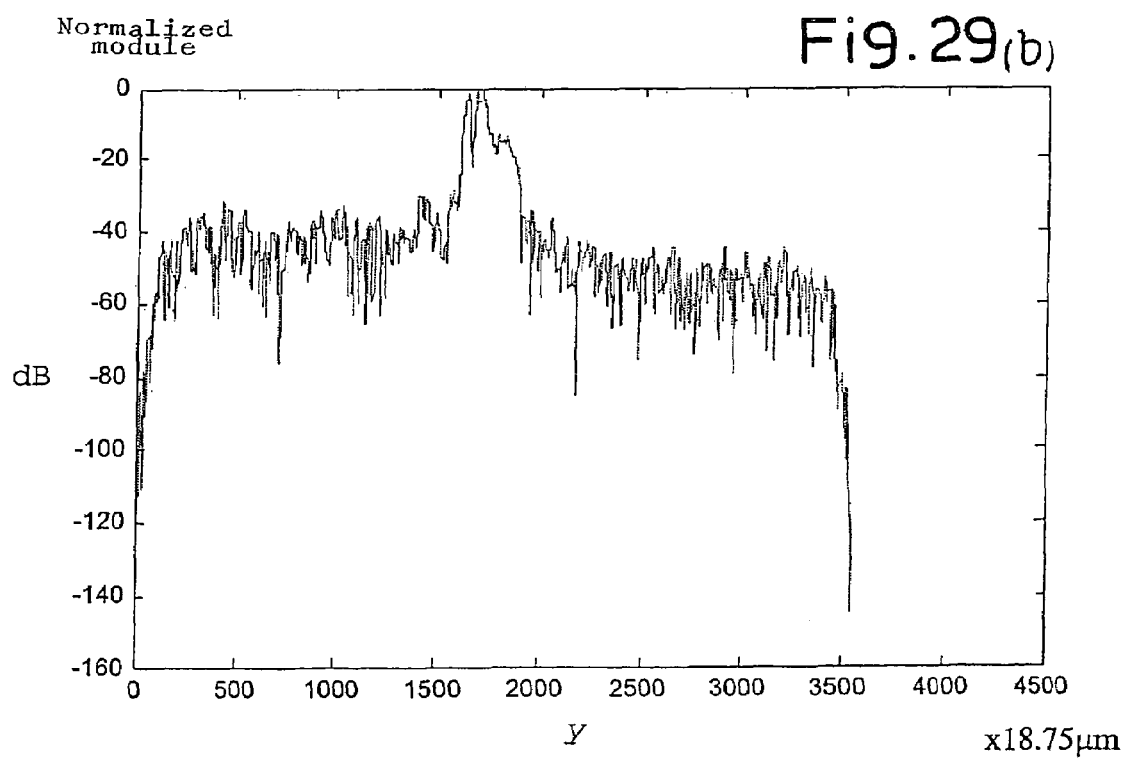

FIGS. 26 to 29(b) show experimental results obtained with the same thread used for the images in the previous figures, but with a traditional ultrasound signal, of the type shown in FIG. 15. FIG. 26 shows, analogously to FIG. 16, the image or real signal acquired by the scanner. Also in this case the thread is at the center of the pattern. FIGS. 27(a) and 27(b) show, analogously to FIGS. 23(a) and 23(b), the final result of processing, i.e. the module of the focused image, with a linear and logarithmic grey scale respectively. FIGS. 28(a) and 28(b) show, in linear scale and in logarithmic scale respectively, the Module of the horizontal trace, centered on the thread, of the focused image, normalized at 1. These figures are equivalent to FIGS. 23(a) and 23(b) obtained with the frequency modulated ultrasound signal. Finally, FIGS. 29(a) and 29(b) show, in linear scale and in logarithmic scale respectively, the module normalized at 1 of the vertical trace centered on the thread of the focused image. These figures are equivalent to the previous FIGS. 19(a) and 19(b).

It can be observed that the method of processing of the present invention allows the desired transverse focusing of the image to be obtained, even in the absence of frequency modulation in the initial ultrasound signal. The results are, in fact, similar to those attained with a frequency modulated signal (chirp signal), although there is a worsening of the depth resolution.

FIGS. 30(a) and 30(b) show, in linear grey scale and in logarithmic grey scale respectively, the result of traditional focusing of the image of the same object. Compared with the results obtained with the method of the present invention and shown in the previous figures, the thread stands out more clearly from the background. That is, an image with greater contrast is obtained. Nonetheless, the resolution obtained is worse and moreover is not uniform. This can be seen with particular clarity in FIGS. 31(a), 31(b) and 31(c) and in FIGS. 32(a), 32(b) and 32(c).

Figure 31A:
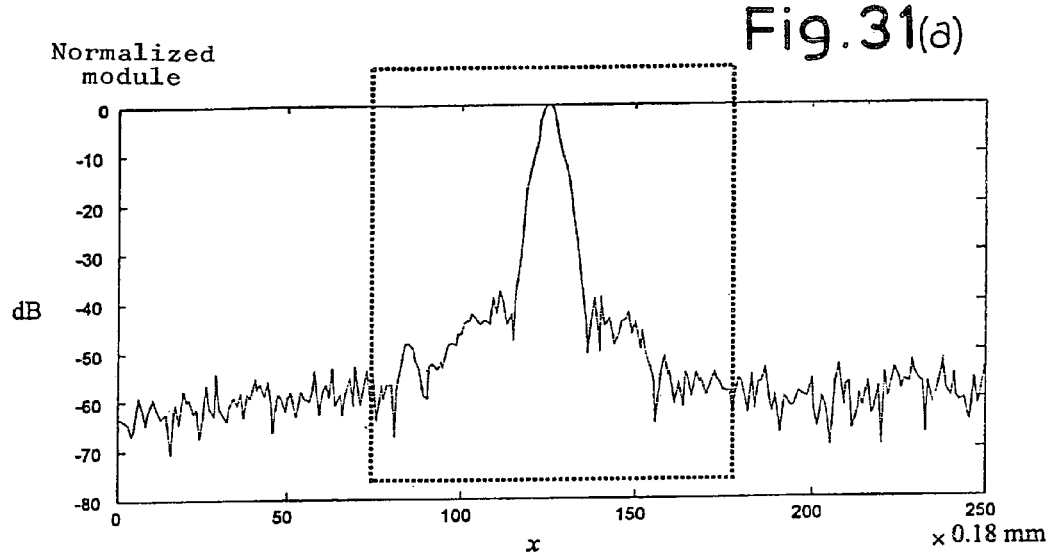
FIGS. 31($a$), ($b$) and ($c$) show the comparison of the module of the horizontal traces centered on the thread obtained with traditional focusing and with focusing according to the method of the present invention, respectively without and with modulation of the signal.
Figure 31B:
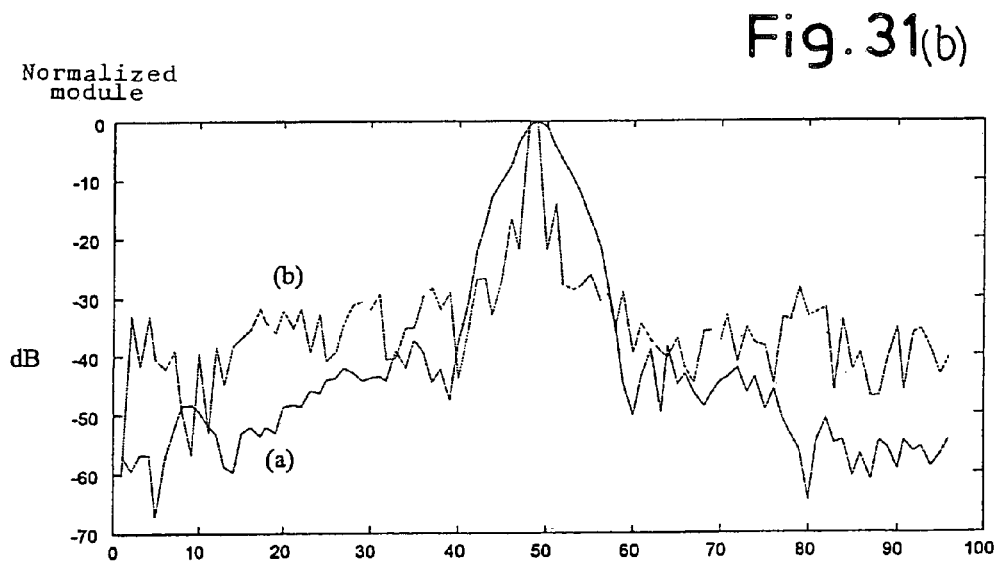
Figure 31C:
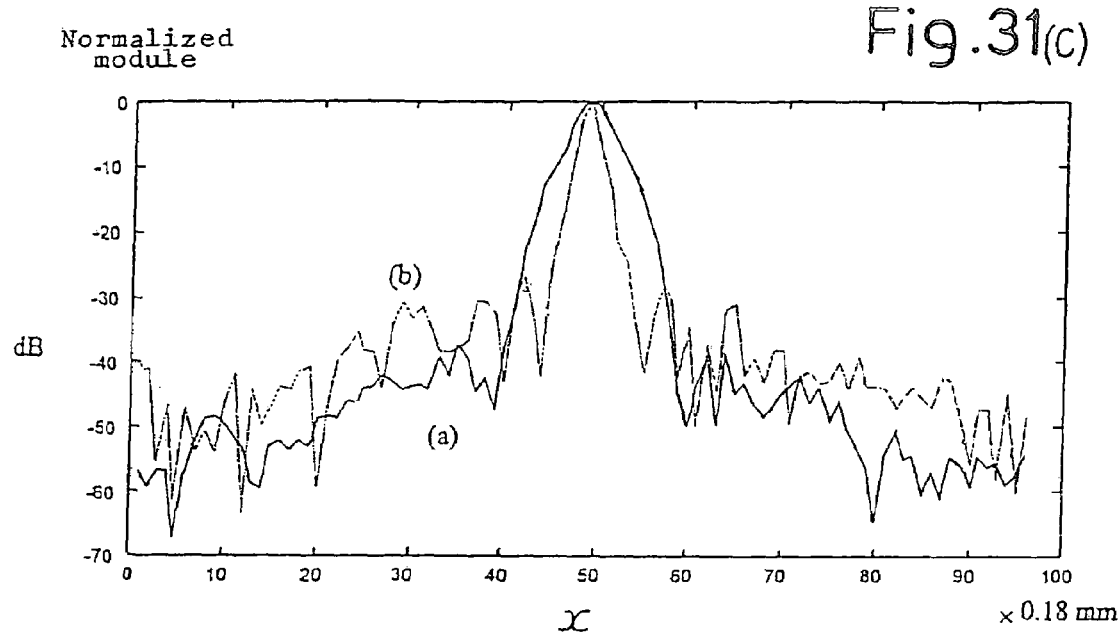

FIG. 31(a) shows the pattern of the module of the horizontal trace centered on the thread, normalized at 1 and in logarithmic scale obtained by the traditional scanner. FIG. 31(b) shows an enlargement (curve a) of the portion of in the square in FIG. 31(a) superimposed on the corresponding pattern obtained with the method of the invention using a non-frequency modulated signal (curve b). FIG. 31(c) shows the same curve (a) as FIG. 31(b) compared with the corresponding pattern (curve b) obtained with the method of the present invention and with frequency modulated ultrasound signal (chirp signal).

Figure 32A:
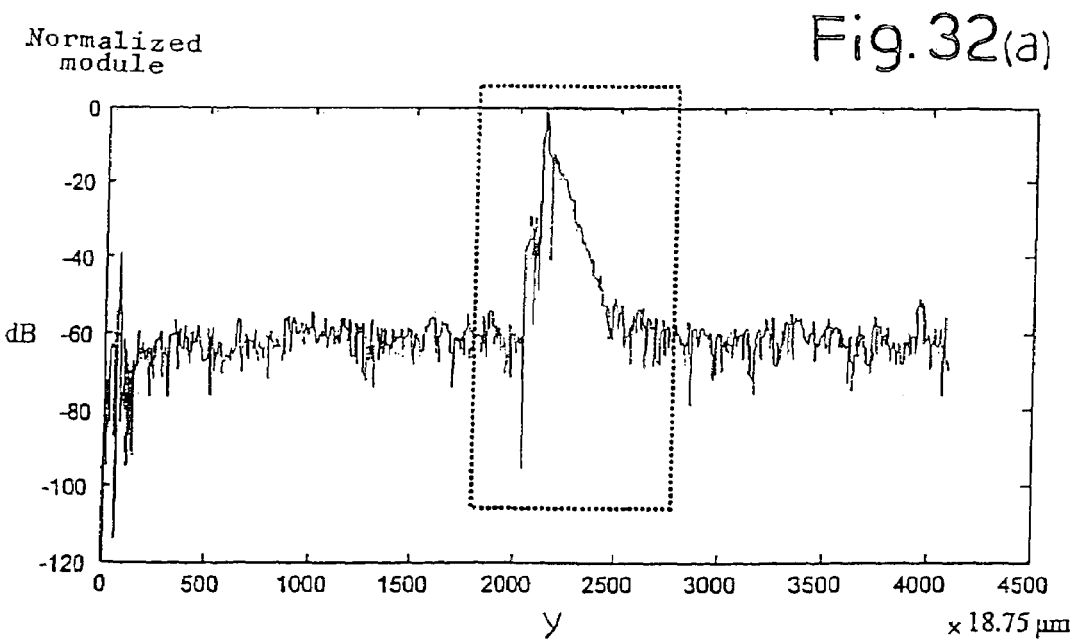
FIGS. 32($a$), ($b$) and ($c$) show the same comparison as FIG. 31 on the vertical trace centered on the thread.
Figure 32B:
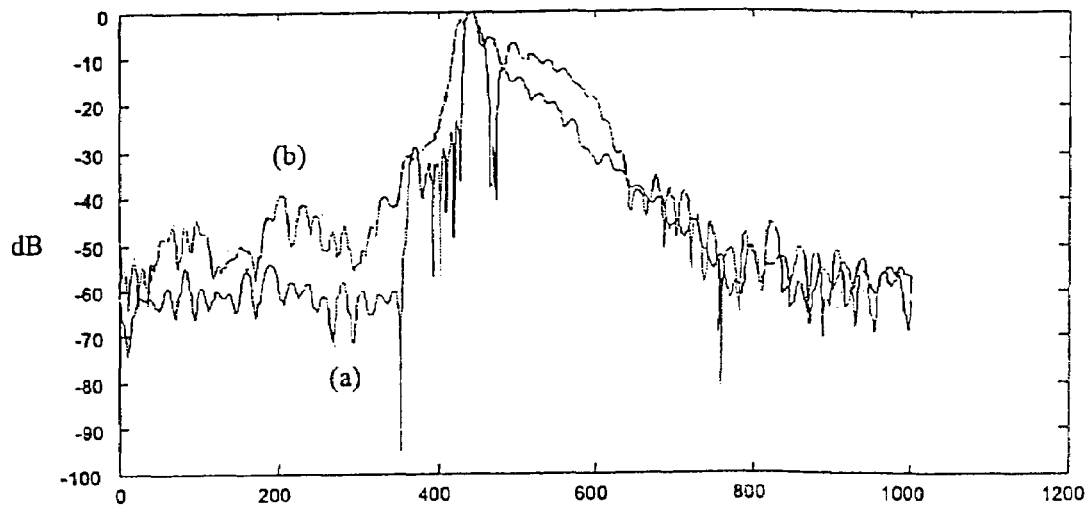
Figure 32C:
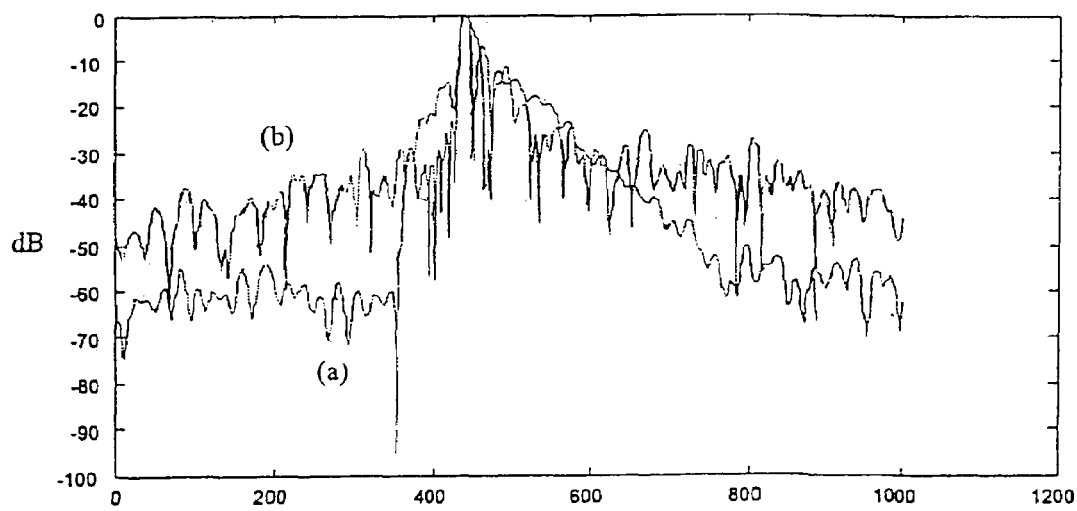

FIGS. 32(a), 32(b) and 32(c) show an analogous comparison of the pattern of the modules of the vertical traces centered on the thread. FIG. 32(a) shows the pattern in the case of a traditional scanner; in FIG. 32(b) this pattern is compared with the one obtained with the focusing method of the present invention using a traditional ultrasound signal, that is non-frequency modulated. Finally, FIG. 32(c) shows comparison with the module of the corresponding vertical trace obtained with a chirp signal, that is frequency modulated.

We claim:

1. An ultrasound image focusing method, comprising the steps of:
    sending to a volume being investigated a series of excitation ultrasonic signals, through an array of transducers aligned in a transverse direction (x), said ultrasonic signals propagating in depth in said volume according to a direction of propagation (y);
    acquiring, through said transducers, signals reflected from at least one reflector located in the volume being investigated, said signals defining a curve in a spatial domain (x, y), defined by said transverse direction (x) and by said direction of propropagation (y);
    performing on said reflected signals a transform in the transverse direction from said spatial domain to a first transformed domain;
    applying, in the transformed domain, a two-dimensional transformation, to straighten said curve (Ip1, Ip2, Ip3) of said at least one reflector in said volume being investigated and make it essentially orthogonal to the direction of propagation (y);
    compressing said straightened curve (Im1, Im2, Im3) in the transverse direction (x) to generate a compressed signal by concentrating said straightened curve in a zone centered at the level of the position of said reflector along said transverse direction (x).

2. Method as claimed in claim 1, wherein the signals acquired are subjected to coherent demodulation of the signal to return it to the base band.

3. Method as claimed in claim 1, wherein said transform in said transverse direction is a Fourier transform.

4. Method as claimed in claim 1, wherein said two-dimensional transformation is expressed by:

$$\begin{cases} \overline{\omega}_x = \omega_x \\ \overline{y} = y\sqrt{1 - \frac{\omega_x^2}{4k^2}} \end{cases}$$

where $\omega_x$ is the coordinate in the direction of the frequencies k is the propagation constant equal to $2\pi/\lambda$ and $\lambda$ is the wavelength of the ultrasonic signal transmitted.

5. Method as claimed in claim 1, wherein said excitation ultrasonic signals are frequency modulated.

6. Method as claimed in claim 5, wherein said frequency modulation is a linear modulation.

7. Method as claimed in claim 1, wherein said excitation ultrasonic signals have a rectangular envelope.

8. Method as claimed in claim 1, wherein the signals reflected from said reflectors are returned to base band by means of coherent demodulation.

9. Method as claimed in claim 1, wherein the signals reflected from said reflectors in the volume being investigated are compressed in the direction of propagation (y).

10. Method as claimed in claim 9, wherein said reflected signals are compressed in the direction of propagation by means of a transform in the direction of propagation (y), from the spatial domain to a frequency domain $(x, \omega_y)$, phase and gain compensation and a subsequent inverse transform.

11. Method as claimed in claim 10, wherein said transform in the direction of propagation is a Fourier transform.

12. Method as claimed in claim 1, wherein said excitation ultrasonic signals are sent to said volume being investigated in sequence from single transducers or from groups comprising a limited number of transducers, and wherein the image of the volume being investigated is obtained by acquiring in sequence, for each signal sent by each single transducer or each group of transducers, the signals reflected from said reflectors and acquired by the transducer or by the group of transducers that emitted the relative signal sent.

13. An ultrasound system comprising at least a probe with an array of transducers aligned in a transverse direction of alignment, means to excite said transducers in sequence, processing means to receive and process signals reflected from reflectors contained in a volume being investigated in which ultrasonic signals generated by said transducers are propagated, said processing means being adapted to perform transverse focusing of the ultrasound signal received by said transducers with a method according to any one of the previous claims.

14. A method in accordance with claim 1, further comprising:
performing an inverse transformation of said compressed signal from a frequency domain to said spatial domain.

15. Method as claimed in claim 14, wherein said inverse transform is completed with gain and phase compensation.

16. A method for focusing ultrasound waves from an object, the method comprising the steps of:
providing an array of transducers aligned in a transverse direction (x);
sending a series of ultrasonic excitation signals from said array of transducers into the object in a propagation direction (y);
acquiring from said transducers, reflected signals reflected from any reflectors arranged in the object;
performing a transverse transformation on said reflected signals in said transverse direction from a spatial domain (x,y), defined by said transverse direction (x) and by said propagation direction (y), to a transformed domain, said reflected signals in said transformed domain being transverse transformed signals;
performing a two-dimensional transformation on said transverse transformed signals to straighten every curved line in said transverse transformed signals representing a reflector in the object, said two-dimensional transformation straightening each said curved line in a direction substantially orthogonal to said propagation direction (y) to form a straightened line;
compressing, in said transverse direction (x), each said straightened line to concentrate said each straightened line in a zone centered at a position of a respective reflector along said transverse direction (x), said compressing forming a compressed signal.

17. A method in accordance with claim 16, wherein:
said transverse transformation produces a curved line in said transverse transformed signals for each of any reflectors in the object.

18. A method in accordance with claim 16, wherein:
said transverse transform is a Fourier transform in said transverse direction (x).

19. A method in accordance with claim 16, further comprising:
performing an inverse transformation of said compressed signal from a frequency domain to said spatial domain.

20. A method in accordance with claim 19, wherein:
said inverse transformation includes gain and phase compensation.

* * * * *

UNITED STATES PATENT AND TRADEMARK OFFICE
CERTIFICATE OF CORRECTION

PATENT NO.      : 7,090,641 B2  
APPLICATION NO. : 10/718333  
DATED           : August 15, 2006  
INVENTOR(S)     : Biagi et al.

Page 1 of 1

It is certified that error appears in the above-identified patent and that said Letters Patent is hereby corrected as shown below:

Title Page  
Item (73) Assignee should read  
-- Actis Active Sensors S.r.I. and Esaote S.p.A. --

Signed and Sealed this

Twelfth Day of December, 2006

JON W. DUDAS  
*Director of the United States Patent and Trademark Office*